United States Patent
Fujii et al.

(10) Patent No.: US 10,723,240 B2
(45) Date of Patent: Jul. 28, 2020

(54) PASSENGER DETECTION DEVICE AND PASSENGER DETECTION PROGRAM

(71) Applicant: AISIN SEIKI KABUSHIKI KAISHA, Kariya (JP)

(72) Inventors: Hiroyuki Fujii, Kariya (JP); Shin Osuga, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 168 days.

(21) Appl. No.: 15/821,919

(22) Filed: Nov. 24, 2017

(65) Prior Publication Data

US 2018/0147955 A1 May 31, 2018

(30) Foreign Application Priority Data

Nov. 25, 2016 (JP) ................... 2016-229256

(51) Int. Cl.
*B60N 2/00* (2006.01)
*B60R 21/015* (2006.01)
*G06K 9/00* (2006.01)

(52) U.S. Cl.
CPC ........ *B60N 2/002* (2013.01); *B60R 21/01516* (2014.10); *B60R 21/01538* (2014.10); *G06K 9/00228* (2013.01); *G06K 9/00838* (2013.01)

(58) Field of Classification Search
None
See application file for complete search history.

(56) References Cited

U.S. PATENT DOCUMENTS

| 6,177,864 | B1 * | 1/2001 | Berberich | B60R 21/01538 340/425.5 |
| 6,490,515 | B1 * | 12/2002 | Okamura | B60N 2/002 180/273 |
| 6,609,054 | B2 * | 8/2003 | Wallace | G06K 9/00362 180/271 |
| 6,636,792 | B2 * | 10/2003 | Lichtinger | B60N 2/002 177/211 |
| 6,957,168 | B2 * | 10/2005 | Tanabe | B60N 2/002 702/101 |
| 7,762,582 | B2 * | 7/2010 | Breed | B60N 2/002 180/274 |

(Continued)

FOREIGN PATENT DOCUMENTS

| JP | 9-150662 | 6/1997 |
| JP | 2006-205844 | 8/2006 |
| JP | 2007-198929 | 8/2007 |

*Primary Examiner* — Michelle M Entezari
(74) *Attorney, Agent, or Firm* — Oblon, McClelland, Maier & Neustadt, L.L.P.

(57) ABSTRACT

A passenger detection device includes: an input unit that receives a captured image of an interior space of a vehicle imaged by an imaging device and a load measured by a load sensor provided on a seat provided in the interior space of the vehicle; a determination unit that determines that a passenger is seated on the seat, in a case where the load is equal to or more than a predetermined threshold value; a detection unit that obtains a face determination degree indicating a certainty of a face of the passenger in the captured image from the captured image; and a threshold value changing unit that changes the threshold value according to the face determination degree.

5 Claims, 14 Drawing Sheets

(56) References Cited

U.S. PATENT DOCUMENTS

| | | | | |
|---|---|---|---|---|
| 7,929,733 | B1* | 4/2011 | Lehnert | G06K 9/00885 |
| | | | | 382/115 |
| 7,974,441 | B2* | 7/2011 | Yamada | G06K 9/00228 |
| | | | | 382/103 |
| 8,081,800 | B2 | 12/2011 | Irie et al. | |
| 8,190,332 | B2* | 5/2012 | Saban | B60N 2/002 |
| | | | | 297/217.3 |
| 8,814,208 | B2* | 8/2014 | Tabe | B60R 21/0152 |
| | | | | 280/734 |
| 9,085,269 | B2* | 7/2015 | Abuelsaad | B60R 21/01516 |
| 9,862,344 | B2* | 1/2018 | Kubota | B60R 21/01546 |
| 2003/0051564 | A1* | 3/2003 | Aoki | B60N 2/002 |
| | | | | 73/862.391 |
| 2003/0125855 | A1* | 7/2003 | Breed | G06K 9/00832 |
| | | | | 701/36 |
| 2004/0215381 | A1* | 10/2004 | Jitsui | B60R 21/01516 |
| | | | | 701/45 |
| 2005/0125351 | A1* | 6/2005 | Tidwell | G06Q 20/042 |
| | | | | 705/42 |
| 2007/0241861 | A1* | 10/2007 | Venkatanna | G06F 21/32 |
| | | | | 340/5.52 |
| 2008/0114517 | A1* | 5/2008 | Nakano | B60N 2/002 |
| | | | | 701/45 |
| 2008/0267460 | A1* | 10/2008 | Aoki | B60R 21/017 |
| | | | | 382/118 |
| 2013/0223696 | A1* | 8/2013 | Azar | G06K 9/00892 |
| | | | | 382/118 |
| 2015/0097977 | A1* | 4/2015 | Watanabe | H04N 5/23258 |
| | | | | 348/208.2 |
| 2016/0180068 | A1* | 6/2016 | Das | G06F 21/32 |
| | | | | 726/7 |
| 2016/0371899 | A1* | 12/2016 | Fujii | G07C 5/0808 |
| 2017/0002889 | A1* | 1/2017 | Battlogg | B60N 2/24 |
| 2017/0061150 | A1* | 3/2017 | Fu | G06K 9/00288 |

* cited by examiner

PASSENGER DETECTION DEVICE AND PASSENGER DETECTION PROGRAM

CROSS REFERENCE TO RELATED APPLICATIONS

This application is based on and claims priority under 35 U.S.C. § 119 to Japanese Patent Application 2016-229256, filed on Nov. 25, 2016, the entire contents of which are incorporated herein by reference.

TECHNICAL FIELD

This disclosure relates to a passenger detection device and a passenger detection program.

BACKGROUND DISCUSSION

In the related art, a passenger detection device that detects a passenger seated on a seat with a load sensor provided on a seat of a vehicle is known. In addition, a passenger detection device that detects a passenger by imaging inside of a vehicle with a camera is also known.

Examples of related art include JP 9-150662A, JP 2007-198929A, and JP 2006-205844A.

However, as described above, the passenger detection device that detects the passenger by the load may erroneously determine that the passenger is seated due to a load of a baggage or the like placed on the seat. It is difficult to determine presence or absence of a passenger who is seated on the seat with high accuracy. In addition, in the passenger detection device that detects the passenger from a captured image of the camera, it is difficult to determine the presence or absence of the passenger with high accuracy depending on an imaging condition, in some cases.

Thus, a need exists for a passenger detection device and a passenger detection program which are not susceptible to the drawback mentioned above.

SUMMARY

A passenger detection device according to an aspect of this disclosure includes, as an example, an input unit that receives a captured image of an interior space of a vehicle imaged by an imaging device and a load measured by a load sensor provided on a seat provided in the interior space of the vehicle, a determination unit that determines that a passenger is seated on the seat, in a case where the load is equal to or more than a predetermined threshold value, a detection unit that obtains a face determination degree indicating a certainty of a face of the passenger in the captured image from the captured image, and a threshold value changing unit that changes the threshold value according to the face determination degree.

A passenger detection program according to an aspect of this disclosure causes, as an example, a computer to execute steps of: receiving a captured image of an interior space of a vehicle imaged by an imaging device and a load measured by a load sensor provided on a seat provided in the interior space of the vehicle; determining that a passenger is seated on the seat, in a case where the load is equal to or more than a predetermined threshold value; obtaining a face determination degree indicating a certainty of a face of the passenger in the captured image, from the captured image; and changing the threshold value according to the face determination degree.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiment 1

Hereinafter, an example that a passenger detection device of the present embodiment is mounted on a vehicle 10 will be described.

Figure 1:
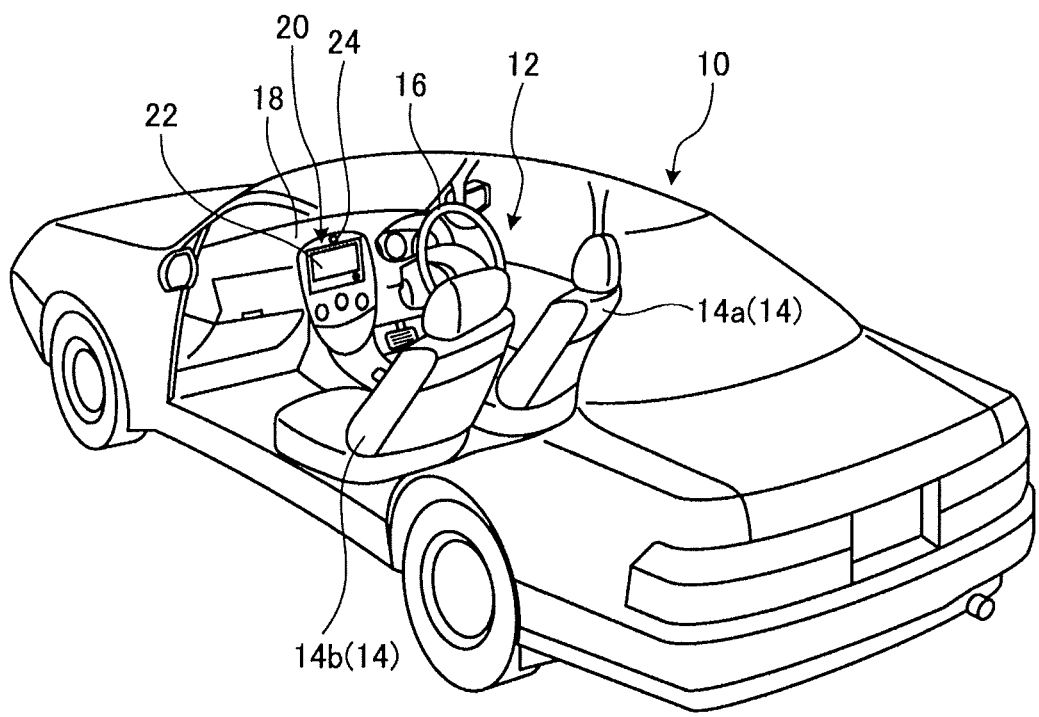
FIG. 1 is a perspective view illustrating an example of a state where a vehicle room of a vehicle mounting a passenger detection device according to Embodiment 1 is partly viewed in a perspective manner.

FIG. 1 is a perspective view illustrating an example of a state where a vehicle room 12 of the vehicle 10 mounting the passenger detection device according to the present embodiment is partly viewed in a perspective manner. In the present embodiment, the vehicle 10 mounting the passenger detection device (a passenger detection system) may be, for example, an automobile including an internal-combustion engine (not illustrated) as a driving source, that is, an internal-combustion engine automobile, an automobile including a motor (not illustrated) as a driving source, that is, an electric automobile and a fuel cell automobile, or the like. In addition, the vehicle 10 may be a hybrid automobile including both of them as driving sources and an automobile equipped with the other driving source.

As illustrated in FIG. 1, the vehicle 10 has the vehicle room 12 where a passenger (a driver or a fellow passenger) (not illustrated) gets in. In the vehicle room 12, a seat 14a for a driver (a driver's seat), a seat 14b for a fellow passenger (a passenger seat), a back seat (not illustrated), and the like are provided. The driver and the fellow passenger are an example of a passenger. In addition, a steering wheel 16, a dashboard 18, and the like are provided in a state of facing the seats 14a and 14b.

In the steering wheel 16 or the dashboard 18, airbags for the seat 14a, and the seat 14b are stored. In addition, in the back surfaces of the seat 14a and the seat 14b, airbags for the back seat (not illustrated) may be stored. In addition, the vehicle 10 may further include a side airbag stored in a door (not illustrated).

In addition, a monitor device 20 is provided at substantially a center portion of the dashboard 18 as an information providing unit that provides various types of information items to the driver or the fellow passenger. The monitor device 20 includes a display device 22 including, for example, a liquid crystal display (LCD), an organic electroluminescent display (OELD), or the like. In addition, the monitor device 20 includes a voice output device (for example, a speaker). The display device 22 is covered with, for example, a transparent operation input unit such as a touch panel.

The vehicle 10 includes an imaging device 24 that images the seats 14a and 14b or the like. The imaging device 24 is, for example, a charge coupled device (CCD) camera or the like. As illustrated in FIG. 1, for example, the imaging device 24 can be provided in the monitor device 20 located substantially at the center of the dashboard 18. The imaging device 24 captures (images) the interior of the vehicle 10 and sequentially outputs a captured image that is image data obtained by imaging the interior of the vehicle 10 to an ECU to be described later.

Figure 2:
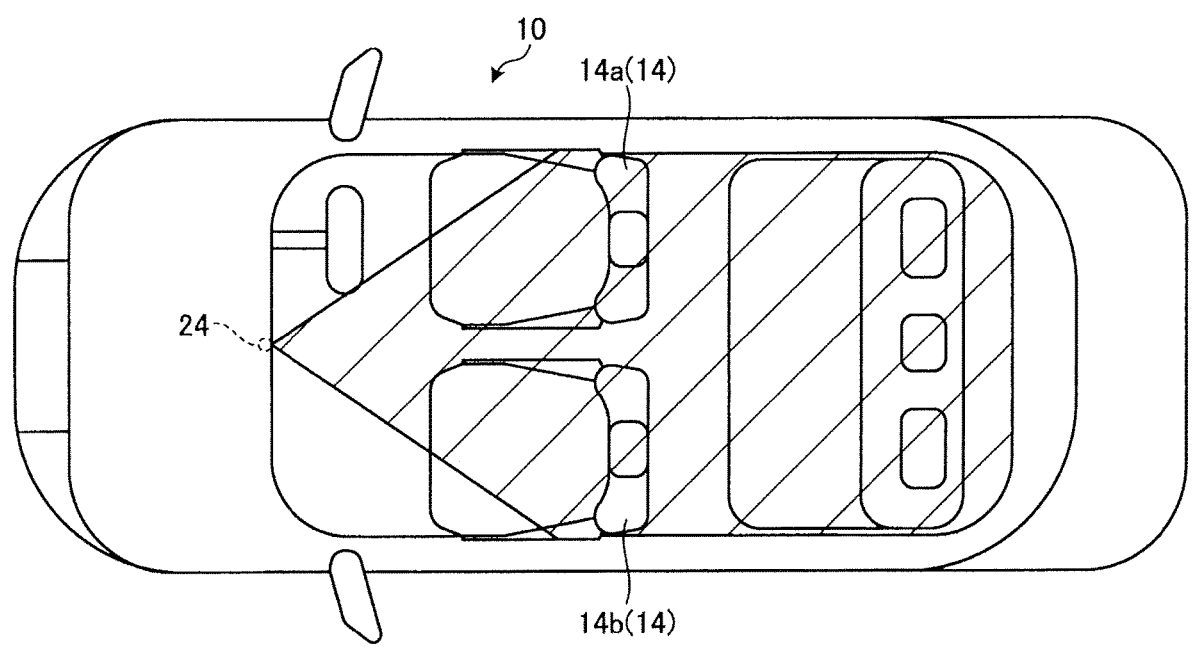
FIG. 2 is a diagram illustrating an example of an imaging range of an imaging device according to Embodiment 1.

FIG. 2 is a diagram illustrating an example of an imaging range of the imaging device 24 according to the present embodiment. As illustrated in FIG. 2, since the imaging device 24 includes the seats 14a and 14b in the imaging range, it is possible to detect a seating state of the seats 14a and 14b by one imaging device 24. Alternatively, the vehicle 10 may include a plurality of imaging devices 24, and may adopt a configuration in which the seat 14a and the seat 14b are imaged, separately.

Figure 3:
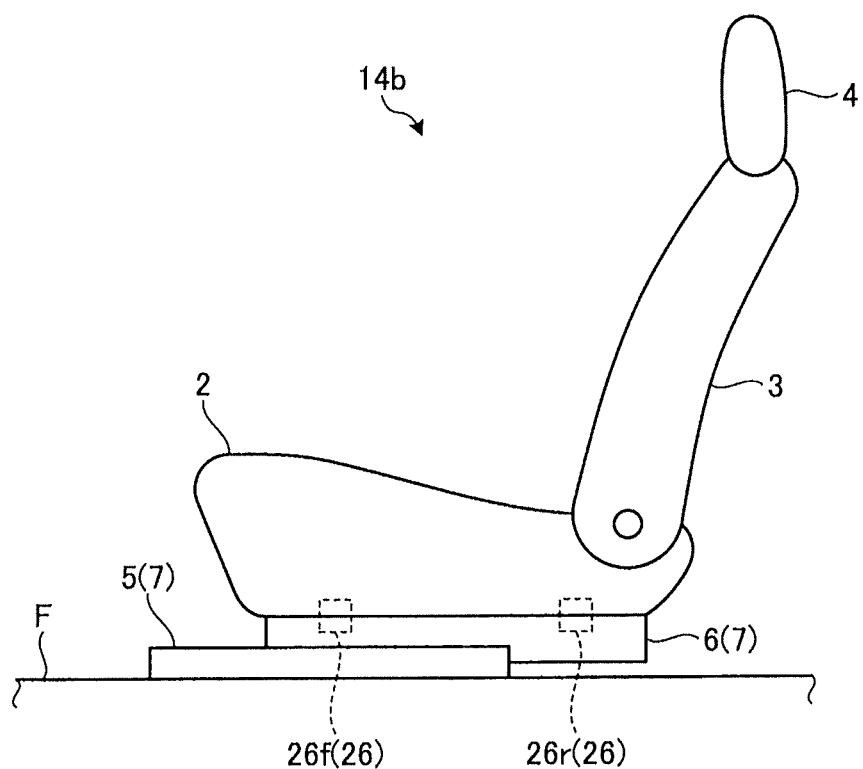
FIG. 3 is a side surface view illustrating an example of a seat for a vehicle according to Embodiment 1.

FIG. 3 is a side surface view illustrating an example of the seat 14b for the vehicle 10 according to the present embodiment. As illustrated in FIG. 3, the seat 14b includes a seat cushion 2, a seat back 3, and a headrest 4. The seat back 3 is provided tiltably with respect to a rear end portion of the seat cushion 2. The headrest 4 is disposed at the upper end of the seat back 3. A pair of left and right lower rails 5 extending in a longitudinal direction of the vehicle 10 are provided on a floor portion F of the vehicle 10. An upper rail 6 that is movable relative to the lower rail 5 along the extending direction is mounted on each lower rail 5. A seat slide device 7 formed by each lower rail 5 and the upper rail 6 supports the seat 14b.

As illustrated in FIG. 3, the seat 14b of the present embodiment is provided with load sensors 26f and 26r below the seat cushion 2. For example, the load sensors 26f and 26r are provided between the upper rail 6 and the seat cushion 2. The load sensors 26f and 26r are sensors for measuring (detecting) the load of the seat 14b.

The load of the seat 14b in the present embodiment is the weight applied to the seat 14b. For example, the load sensors 26f and 26r measure the weight of the baggage placed on the seat cushion 2 of the seat 14b or the weight of the passenger on the seat cushion 2 of the seat 14b as a load of the seat 14b. It is not limited to this. For example, in a case where the baggage is hung on a hook (not illustrated) provided on the back surface of the seat 14b and a case where the passenger on the seat 14a (the driver's seat) applies the weight on a hand itself on the seat 14b, the load is applied to the seat 14b. The load sensors 26f and 26r measure these loads.

For example, the load sensors 26f and 26r may adopt a well-known strain sensor or a load cell. In addition, the load sensor 26f is disposed on the front side of the seat 14b, and the load sensor 26r is disposed on the rear side of the seat 14b, respectively. Hereinafter, in a case where it is not necessary to particularly distinguish between the two load sensors, it is referred to as a load sensor 26.

Figure 4:
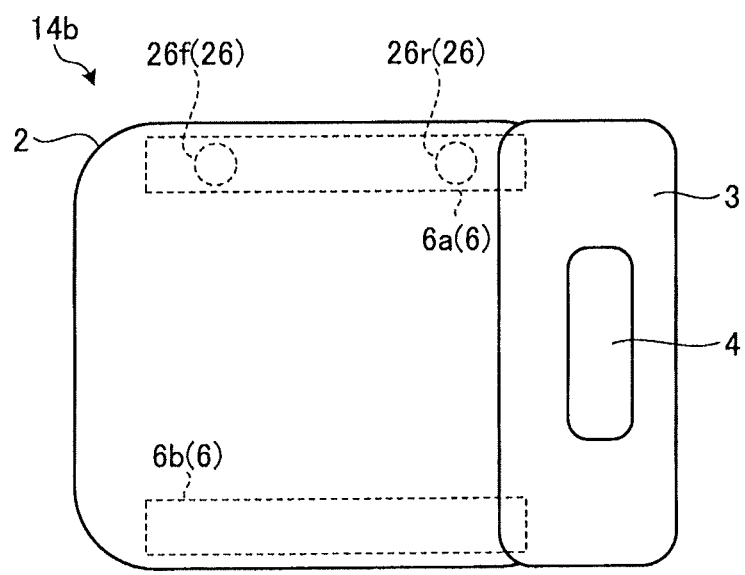
FIG. 4 is a plan view illustrating an example of the seat for a vehicle according to Embodiment.

FIG. 4 is a plan view that an example of the seat 14b for a vehicle according to the present embodiment is illustrated. FIG. 4 illustrates a configuration of the seat cushion 2, the seat back 3, and the headrest 4 of a case where the seat 14b is viewed from above. In addition, as illustrated in FIG. 4, the upper rail 6 has a pair of an upper rail 6a and an upper rail 6b. The upper rail 6a is positioned on the right side (the drivers seat side) of the seat 14b, and the upper rail 6b is positioned on the left side (a window side) of the seat 14b. As illustrated in FIG. 4, the load sensors 26f and 26r are disposed between the right upper rail 6a and the seat cushion 2. In the passenger detection system of the present embodiment, since the load of the seat 14b is measured by the two load sensors 26 disposed on the right front side and the right rear side of the seat 14b, the load of the seat 14b can be measured efficiently with a small number of the load sensors 26.

In FIGS. 3 and 4, the seat 14b (the passenger seat) is illustrated as an example. However, the seat 14a (the drivers seat) may have the same configuration. In a case where the seat 14a includes the load sensor 26, the disposition position of the load sensor 26 is reversed to the left and right of the seat 14b. That is, the seat 14a includes the load sensor 26 on a side (the passenger seat side) of the upper rail 6b. In addition, the load sensor 26 may also be disposed on the back seat (not illustrated).

Figure 5:
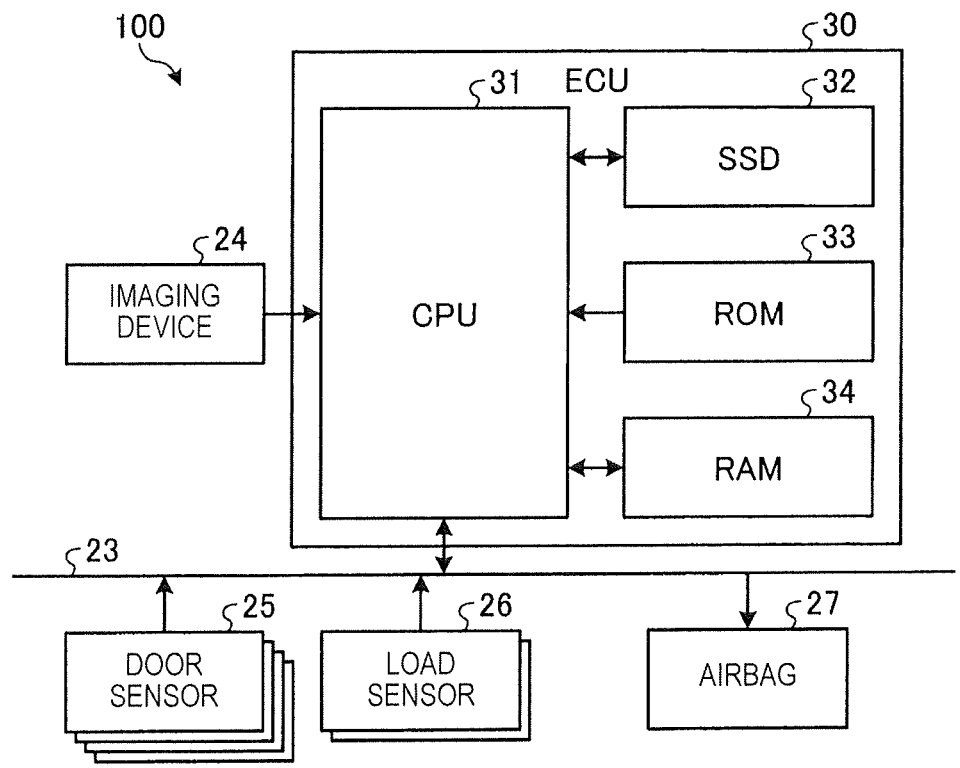
FIG. 5 is a diagram illustrating an example of a hardware configuration of a passenger detection system according to Embodiment 1.

Next, a passenger detection system including the passenger detection device on the vehicle 10 according to the present embodiment will be described. FIG. 5 is a diagram illustrating an example of a hardware configuration of a passenger detection system 100 according to the present embodiment. As illustrated in FIG. 5, in the passenger detection system 100, an ECU 30, a door sensor 25, the load sensor 26, an airbag 27, and the like are electrically connected to each other via an in-vehicle network 23 as an electric communication line. The in-vehicle network 23 is, for example, configured as a controller area network (CAN). The ECU 30 can control the airbag 27 or the like by sending a control signal through the in-vehicle network 23. In addition, the ECU 30 can receive detection results of four door sensors 25 and two load sensors 26 (26f and 26r) and the like via the in-vehicle network 23. In addition, the ECU 30 can receive the captured image from the imaging device 24. Here, the ECU 30 is an example of the passenger detection device according to the present embodiment.

Each of four door sensors 25 is disposed on the different doors, respectively. Each door sensor 25 detects at least whether the corresponding door is in a closed state or an open state. Each door sensor 25 may detect angle at which the door is open. In addition, the number of the door sensors 25 is not limited to four. In the present embodiment, it is assumed that the door sensor 25 can detect at least opening and closing of the door at the passenger seat.

The ECU 30 includes, for example, a central processing unit (CPU) 31, a solid state drive (SSD) 32 (a flash memory), a read only memory (ROM) 33, a random access memory (RAM) 34, or the like. The CPU 31 controls the entirety of the vehicle 10. The CPU 31 can read out a program installed and stored in a nonvolatile storage device such as the ROM 33 and can execute an arithmetic process according to the program. The RAM 34 temporarily stores various data items used in the operation in the CPU 31. In addition, the SSD 32 is a rewritable nonvolatile storage unit, and can store data even in a case where a power supply of the ECU 30 is turned off. The CPU 31, the ROM 33, the RAM 34, and the like can be integrated in the same package. In addition, the ECU 30 may be configured to use another logic operation processor such as a digital signal processor (DSP), a logic circuit, or the like instead of the CPU 31. A hard disk drive (HDD) may be provided instead of the SSD 32, and the SSD 32 and the HDD may be provided separately from the ECU 30.

The configurations, arrangement, electrical connection form, and the like of the above-described various sensors and the like are merely examples and can be set (changed) in various manners. In addition, although the passenger detection system 100 is described as an example including one ECU 30 as the passenger detection device in FIG. 5, it is not limited to this configuration, and the passenger detection system 100 may adopt a configuration including a plurality of ECUs.

Figure 6:
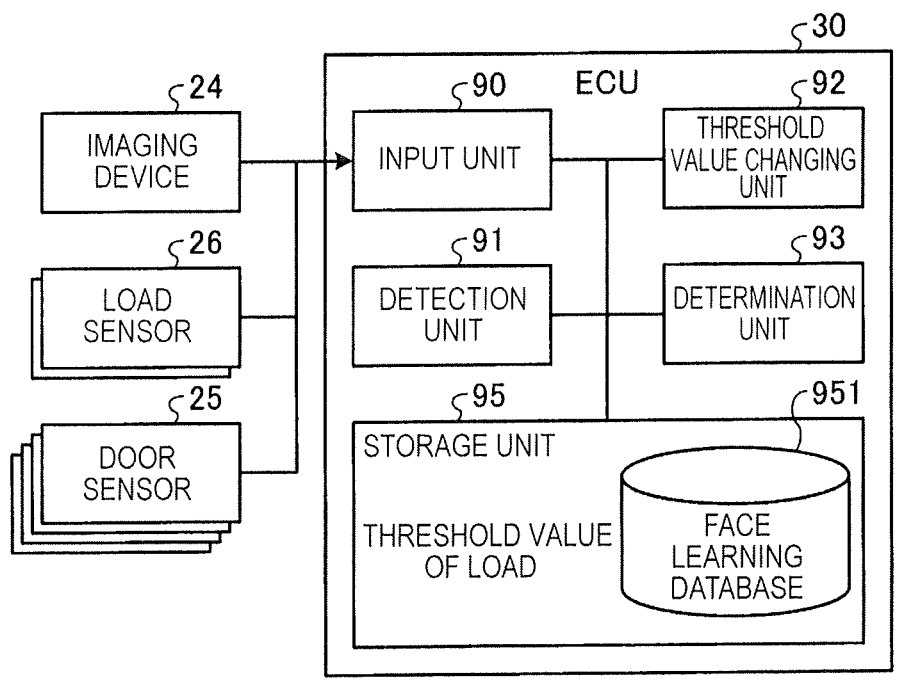
FIG. 6 is a block diagram illustrating an example of a functional configuration of an ECU according to Embodiment 1.

Next, a functional configuration of the ECU 30 in the present embodiment will be described. FIG. 6 is a block diagram illustrating an example of a functional configuration of the ECU 30 according to the present embodiment. As illustrated in FIG. 6, the ECU 30 mainly functions as an input unit 90, a detection unit 91, a threshold value changing unit 92, and a determination unit 93. As illustrated in FIG. 6, each of configurations of the input unit 90, the detection unit 91, the threshold value changing unit 92, and the determination unit 93 is realized by executing the program stored in the ROM 33 by the CPU 31. These configurations may be realized by a hardware circuit.

A storage unit 95 illustrated in FIG. 6 is configured by a storage device such as the SSD 32, for example. The storage unit 95 stores a load threshold value described later and a face learning database 951. In addition, the storage unit 95 may adopt the configuration that a passenger detection result which is determined by the determination unit 93 to be described is stored.

The input unit 90 receives the captured image imaged by the imaging device 24 from the imaging device 24. In addition, the input unit 90 receives the load of the seat 14b which is measured by the load sensor 26, from the load sensor 26. Furthermore, the input unit 90 receives a signal indicating opening and closing of the door of the passenger seat from the door sensor 25. The input unit 90 transmits the received captured image and a signal indicating opening and closing the door to the detection unit 91. In addition, the input unit 90 transmits the received load to the determination unit 93.

The detection unit 91 obtains the face determination degree in the captured image acquired by the input unit 90.

Figure 7:
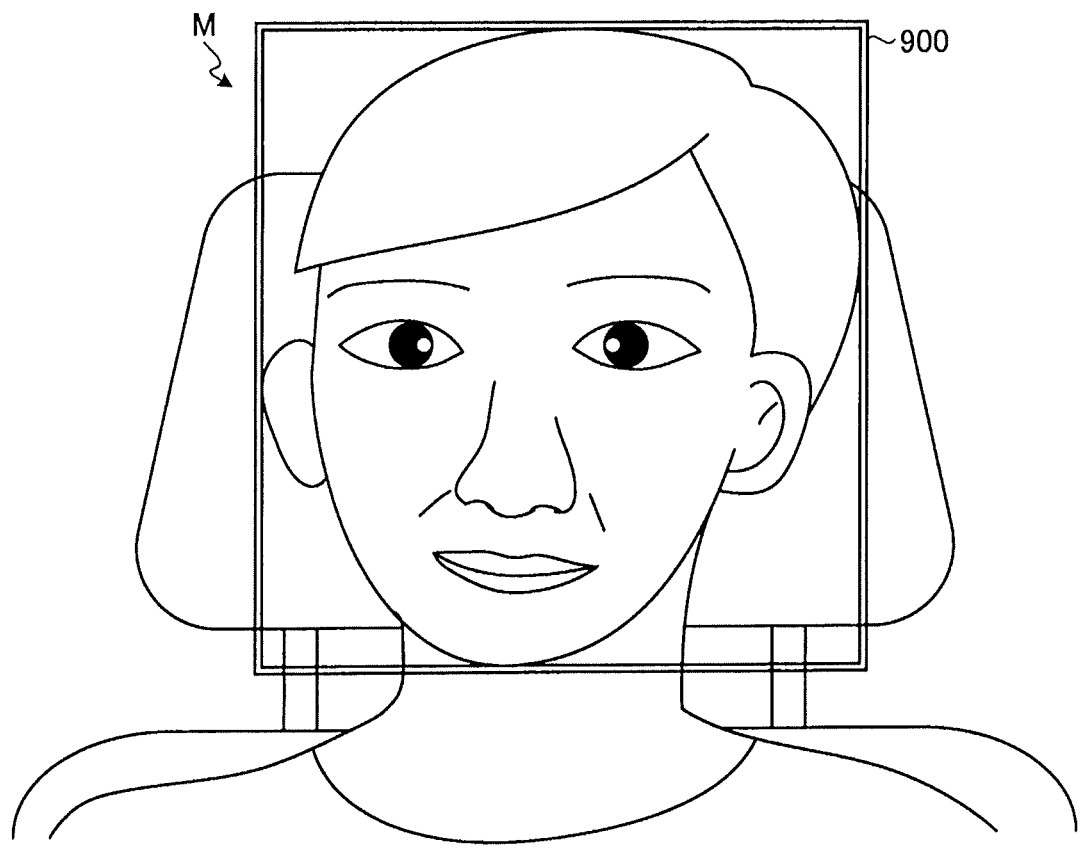
FIG. 7 is a diagram illustrating an example of face detection according to Embodiment 1.

The face determination degree is an index indicating a certainty of a face of the passenger. The face determination degree becomes higher as the face of the passenger is certainly included in the captured image. FIG. 7 is a diagram illustrating an example of face detection according to the present embodiment. The captured image illustrated in FIG. 7 includes a face of a passenger M seated on the seat 14b. The detection unit 91 detects a range 900 that may be the face of the passenger M from the captured image and further evaluates the degree to which the image of the range 900 appears like a face.

For example, the detection unit 91 may adopt a configuration in which the face determination degree of the captured image is obtained by a neural network or the like using the face learning database 951 stored in advance in the storage unit 95. For example, the face learning database 951 may include data of a three-dimensional face model of a plurality of examinees (models), data of facial parts, and data of feature points. In addition, the detection unit 91 may adopt a configuration that generates the three-dimensional face model from a captured image using a well-known technique and compares it with data of the face learning database 951 to evaluate face likeness. For example, in a case where the detection unit 91 cannot detect a range in which a possibility of being a face from the captured image can be detected, it is assumed that the face determination degree is the lowest in the captured image. In addition, as the degree of face likeness in the image in the range detected by the detection unit 91 is higher, the face determination degree of the captured image is assumed to be higher. The above-described method of calculating the face detection and the face determination degree is an example, and it is not limited thereto.

Figure 8:
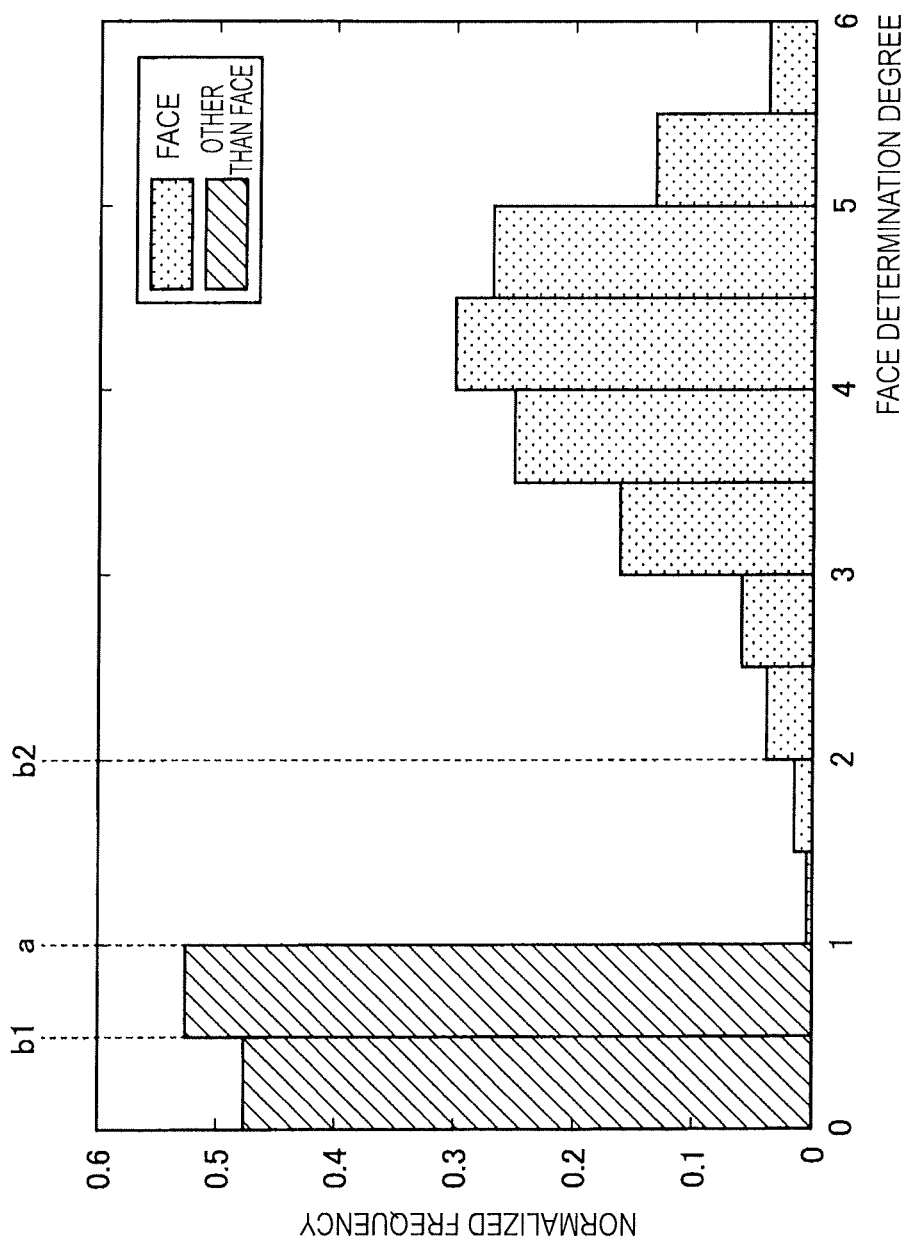
FIG. 8 is a histogram illustrating an example of distribution of face determination degrees according to Embodiment 1.

FIG. 8 is a histogram illustrating an example of distribution of face determination degrees according to the present embodiment. In FIG. 8, a horizontal axis represents the face determination degree and a vertical axis represents a normalization frequency obtained by normalizing the number of samples (degrees) at each determination degree. FIG. 8 illustrates the output result of the detection unit 91 in a case where the detection unit 91 obtains the number of the face determination degree for the captured image obtained by imaging a face and the captured image obtained by imaging an image other than the face. As illustrated in FIG. 8, the face determination degree in the captured image obtained by imaging the face becomes "1" or more. Since the degree of certainty of the face of the passenger M in the captured image is higher as the face determination degree is higher, the captured image more reliably includes the face of the passenger M. In addition, the face determination degree in the captured image obtained by imaging something other than the face becomes less than "1". It is certain that the captured image does not include the face of the passenger M as the face determination degree becomes lower. The detection unit 91 transmits the face determination degree to the threshold value changing unit 92.

In the present embodiment, the face determination degree "1" is set as a reference value a for dividing whether or not a face is included in the captured image, but this value is an example, and is not limited thereto. The reference value a in the present embodiment is an example of a predetermined reference. In addition, the face determination degree in the present embodiment indicates values of 0 to 6. However, it is not limited thereto. For example, the detection unit 91 may indicate the face determination degree by a rank such as A, B, C, or the like, or may be simply classified as "high" or "low".

Returning to FIG. 6, in a case where the load acquired from the input unit 90 is equal to or more than the threshold value, the determination unit 93 determines that the passenger M is seated on the seat 14b. The determination unit 93 may adopt a configuration in which the determination result of the presence or absence of passenger M (a passenger detection result) is stored in the storage unit 95. Alternatively, the determination unit 93 may adopt a configuration of outputting the determination result to an external device (not illustrated).

The threshold value changing unit 92 changes the threshold value of the load according to the face determination degree acquired from the detection unit 91. Specifically, the threshold value changing unit 92 changes the threshold value such that the threshold value becomes smaller as the face determination degree acquired from the detection unit 91 is higher. For example, it is assumed that the threshold value of the load stored in the storage unit 95 is an initial value matched with the case where the face determination degree is the reference value a illustrated in FIG. 8. In a case where the face determination degree is equal to or more than the reference value a, the threshold value changing unit 92 sets the threshold value smaller than the initial value. As described above, in a case where the face determination degree is high, the threshold value changing unit 92 changes the threshold value, so that the determination unit 93 determines that the passenger M is seated on the seat 14b even with a smaller load.

In addition, in a case where the face determination degree is less than the reference value a, the threshold value changing unit 92 sets the threshold value to be more than the initial value. As described above, in a case where the face determination degree is low, the threshold value changing unit 92 changes the threshold value, so that the determination unit 93 determines that the passenger M is not seated on the seat 14b even with a larger load. The threshold value changing unit 92 transmits the changed threshold value to the determination unit 93.

In the present embodiment, the initial value of the threshold value is the threshold value of the load of a case where the face determination degree is the reference value a, but it is not limited thereto. For example, a configuration, in which the initial value of the threshold value is set high according to a case where the face determination degree is low and the threshold value changing unit 92 changes the threshold value to a smaller value as the face determination degree is higher, may be adopted.

Figure 9:
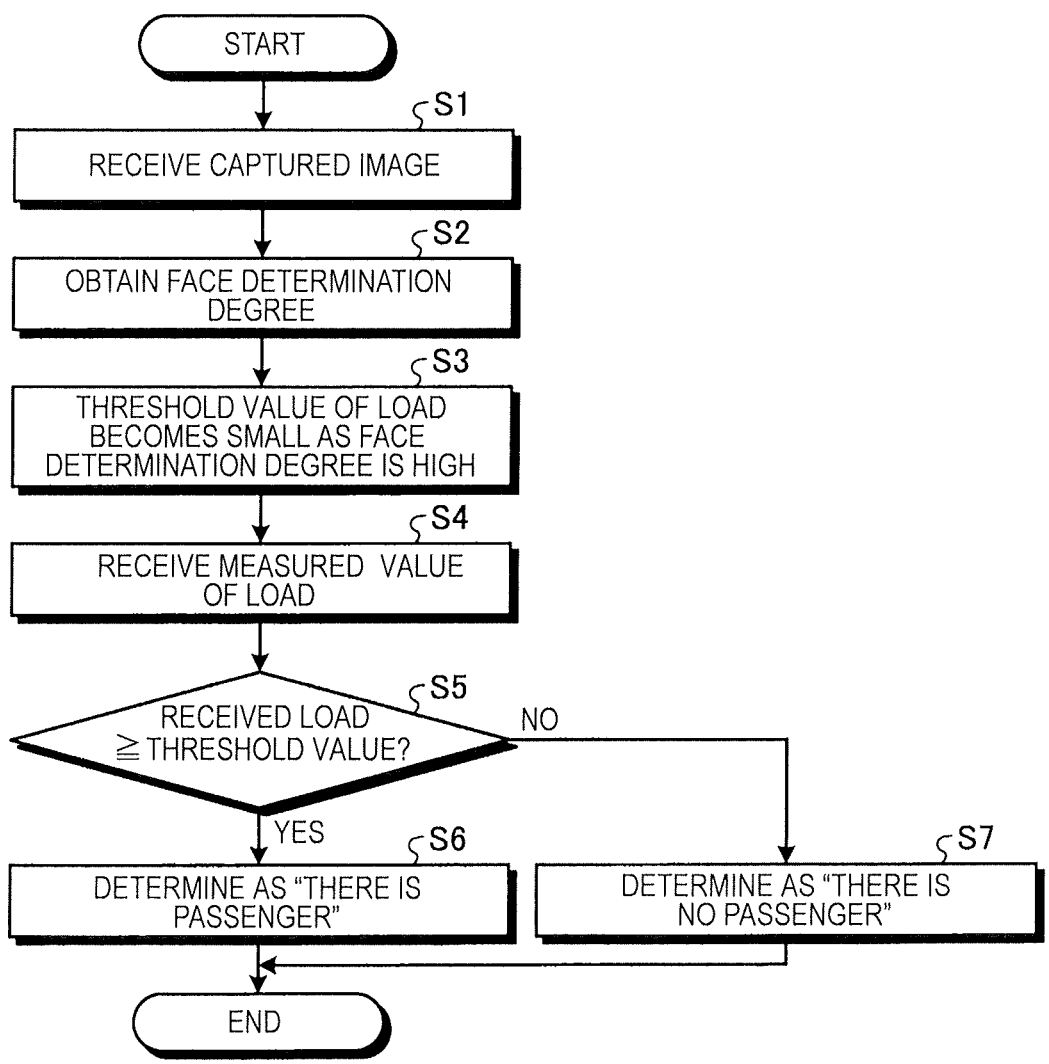
FIG. 9 is a flowchart illustrating an example of a procedure of a passenger detection process by the ECU according to Embodiment 1.

Next, a passenger detection process of the present embodiment configured as described above will be described. FIG. 9 is a flowchart illustrating an example of a procedure of a passenger detection process by the ECU 30 according to the present embodiment. A process of the flowchart starts, for example, in a case where the input unit 90 receives the signal indicating opening and closing the door from the door sensor 25. Alternatively, the process of this flowchart may be started at certain time intervals in a case where an ignition power supply of the vehicle 10 is turned on.

The input unit 90 receives the captured image from the imaging device 24 (S1). The input unit 90 transmits the received captured image to the detection unit 91.

The detection unit 91 obtains the face determination degree in the received captured image (S2). The detection unit 91 transmits the obtained face determination degree to the threshold value changing unit 92.

The threshold value changing unit 92 reduces the threshold value of the load as the face determination degree acquired from the detection unit 91 becomes higher (S3). The threshold value changing unit 92 transmits the changed threshold value to the determination unit 93.

The input unit 90 receives a measured value of the load from the load sensor 26 (S4). The input unit 90 transmits the received measured value of the load to the determination unit 93.

The determination unit 93 acquires the value of the load received by the input unit 90 and the threshold value of the load which is changed by the threshold value changing unit 92. In a case where the received value of the load is equal to or more than the threshold value of the load ("Yes" in S5), the determination unit 93 determines that the passenger M is seated on the seat 14b, and determines as "there is a passenger" (S6).

In addition, in a case where the received value of the load is less than the threshold value of the load ("No" in S5), the determination unit 93 determines that there is no passenger M seated on the seat 14b, and determines as "there is no passenger" (S7). VVhen the determination unit 93 determines the presence or absence of the passenger M, a process of the flowchart ends.

The ECU 30 controls switching of the mode as to whether or not to deploy the airbag 27 in a case where an impact is detected, based on the passenger detection result determined by the determination unit 93. For example, in a case where the latest determination result is "there is a passenger", the ECU 30 sets the airbag 27 in a deployment mode and in a case where the latest determination result is "there is no passenger", the ECU 30 sets the airbag 27 in the non-deployment mode.

As described above, in the ECU 30 in the present embodiment, the detection unit 91 obtains the face determination degree indicating the certainty of the face of the passenger M in the captured image from the captured image in which the interior of the vehicle 10 is imaged and the threshold value changing unit 92 changes the threshold value of the load according to the face determination degree. In a case where the load which is measured by the load sensor 26 of the seat 14b of the vehicle 10 is equal to or more than the threshold value, the determination unit 93 determines that the passenger M is seated on the seat 14b. Accordingly, according to the ECU 30 in the present embodiment, it is possible to suppress erroneous detection due to a load of a baggage or the like and distinguish the presence or absence of the passenger M who is seated on the seat 14b of the vehicle 10 with high accuracy.

Further, since the threshold value changing unit 92 changes the threshold value of the load smaller as the face determination degree in the captured image is higher, according to the ECU 30 in the present embodiment, even in a case where a passenger having a light body weight is seated on the seat, it is possible to detect the passenger M with high accuracy. In other words, in a case where the face determination degree in the captured image is low, since the threshold value of the load becomes large, according to the ECU 30 in the present embodiment, it is possible to suppress the erroneous detection as the passenger even in a case where a baggage having the same degree of weight as the weight of a person is placed on the seat 14b.

In addition, the ECU 30 according to the present embodiment not only determines the face determination degree in the captured image but also makes a determination based on the load. Therefore, the reliability of passenger detection can be maintained irrespective of imaging conditions. For example, even in a case where it is difficult to precisely determine the face determination degree because the captured image is unclear due to fogging, dirt of a lens of the imaging device 24, backlight, or the like, it is possible to detect that the passenger M is seated on the seat by making a determination based on the load. In addition, in the ECU 30 according to the present embodiment, even in a case where the face of the passenger M on the back seat appears in the captured image, or even in a case where the face determination degree of the captured image is high depending on a pattern of the seat 14b, it is possible to suppress erroneous detection by performing the combined determination by the load.

In addition, since the determination unit 93 of the present embodiment can detects the passenger M with high accuracy, switching of the mode whether the airbag 27 is deployed can be controlled with higher accuracy. For example, even in a case where the passenger M having a light body weight is seated on the seat, it is possible to deploy the airbag 27 by the ECU 30. In addition, in a case where the baggage is placed on the seat 14b, the ECU 30 can prevent the airbag 27 being deployed when the baggage is erroneously detected as the passenger M. As described above, according to the ECU 30 in the present embodiment, it is possible to provide the deployment control of the airbag 27 with high safety by detecting the passenger M with high accuracy.

In addition, in a case where the ECU 30 includes a seat belt reminder function for issuing an alarm or the like in a case where the vehicle 10 starts moving in a state where with the seat belt not being worn by the passenger M seated on the seat 14b, the ECU 30 may adopt a configuration that controls whether or not to issue an alarm according to the passenger detection result. For example, the ECU 30 may adopt a configuration that issues the alarm or the like to urge the seat belt to be worn in a case where the latest determination result is "there is a passenger" and the seat belt is not worn. In the case where this configuration is adopted, the ECU 30 can issue an alarm prompting the user to wear the seat belt even in a case where the passenger M having a light body weight is seated on the seat. In addition, in a case where the baggage is placed on the seat 14b, the ECU 30 can prevent from issuing the alarm to urge the seat belt to be worn when the baggage is erroneously detected as the passenger M.

In the present embodiment, the example in which the passenger M sitting on the seat 14b (the passenger seat) is detected is described. However, it is not limited thereto. The passenger detection device of the present embodiment can also be applied to the seat 14a (the driver's seat) and the back seat.

In addition, in the present embodiment, two load sensors 26 are provided on the seat 14b. However, it is not limited thereto. For example, a configuration in which four load sensors 26 are disposed on the seat 14b may be adopted.

In addition, in the present embodiment, the configuration in which the threshold value changing unit 92 changes the threshold value of the load according to the face determination degree is adopted. However, it is not limited thereto. For example, the ECU 30 may adopt a configuration of adding to the measured value of the load as the face determination degree is higher.

Embodiment 2

In Embodiment 1, the threshold value of the load is changed according to the face determination degree regardless of a magnitude of the difference between the face determination degree and the reference value a in the captured image. On the other hand, in the present embodiment, in a case where the difference between the face determination degree and the reference value a is within a predetermined range, the threshold value of the load is not changed.

The hardware configuration and the functional configuration of the ECU 30 of the present embodiment are the same as those of Embodiment 1 illustrated in FIGS. 5 and 6. In addition, in a case where the difference between the face determination degree and the reference value a is included within a predetermined range, the threshold value changing unit 92 of the present embodiment does not change the threshold value of the load. Specifically, in a case where the face determination degree is within a range that the face determination degree is equal to or more than a first reference value b1 illustrated in FIG. 8 and less than a second reference value b2, the threshold value changing unit 92 of the present embodiment does not change the threshold value of the load. In other words, in a case where the face determination degree is less than the first reference value b1 or equal to or more than the second reference value b2, the threshold value changing unit 92 of the present embodiment sets the threshold value of the load smaller as the face determination degree is higher.

As illustrated in FIG. 8, the reference value a of the face determination degree is a boundary between whether or not a face is included in the captured image. As the face determination degree is higher than the reference value a, the captured image contains the face more reliably. In other words, as the face determination degree is lower than the reference value a, the face is not included more reliably in the captured image. That is, as the difference between the face determination degree of the captured image and the reference value a increases, the reliability of the determination as to whether or not the face is included in the captured image increases. In the present embodiment, the threshold value changing unit 92 determines the presence or absence of the passenger M with higher accuracy by changing the threshold value of the load only in a case where the captured image contains a face more reliably and a case where the face is not included more reliably in the captured image.

In the present embodiment, a range that is equal to or more than the first reference value b1 and less than the second reference value b2 illustrated in FIG. 8 is set as a predetermined range. As illustrated in FIG. 8, the face determination degree of the first reference value b1 is lower than that of the reference value a. In addition, the face determination degree of the second reference value b2 is higher than that of the reference value a. In FIG. 8, as an example, the face determination degree of the reference value a is set to "1", the face determination degree of the first reference value b1 is set to "0.5", and the face determination degree of the second reference value b2 is set to "2". That is, in the present embodiment, in a case where the value subtracting the reference value a ("1") from the face determination degree is within a range of "−0.5" to "+1", the threshold value changing unit 92 changes the threshold value of the load. The value of the reference values in the present embodiment is an example, and it is not limited thereto.

Figure 10:
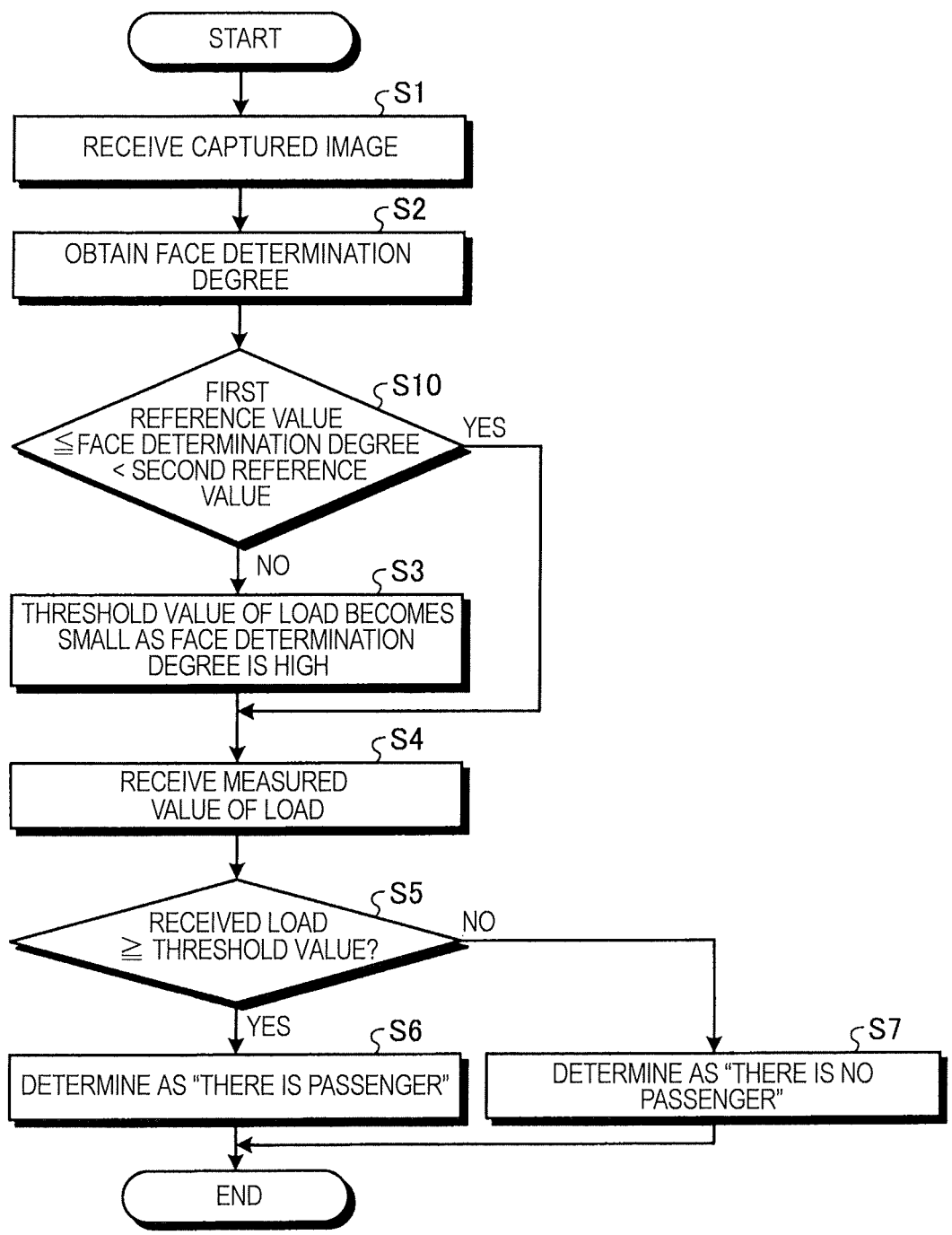
FIG. 10 is a flowchart illustrating an example of a procedure of a passenger detection process by an ECU according to Embodiment 2.

FIG. 10 is a flowchart illustrating an example of a procedure of a passenger detection process by the ECU 30 according to the present embodiment. A start condition of the flowchart is the same as that of Embodiment 1. In addition, processes of receiving of the captured image of S1 and obtaining the face determination degree of S2 are the same as the processes of Embodiment 1 illustrated in FIG. 9.

In a case where the face determination degree is within a range that the face determination degree is equal to or more than the first reference value b1 and is less than the second reference value b2 ("Yes" in S10), since the difference between the face determination degree of the captured image and the reference value a is within the predetermined range, the threshold value changing unit 92 of the present embodiment does not change the threshold value of the load. In addition, in a case where the face determination degree is less than the first reference value b1 or equal to or more than the second reference value b2 ("No" in S10), since threshold value changing unit 92 of the present embodiment reduces the threshold value of the load as the face determination degree becomes higher (S3).

Processes from the receiving of the measured value of the load of S4 to determining of the presence or absence of the passenger M of S6 and S7 are the same processes as the processes of Embodiment 1 illustrated in FIG. 9.

As described above, in a case where the difference between the face determination degree of the captured image and the reference value a is within a predetermined range, the ECU 30 in the present embodiment does not change the threshold value of the load. That is, in a case where the face determination degree takes a value near the boundary as to whether or not a face is included in the captured image, the ECU 30 of the present embodiment does not adopt the result of the face determination degree. Accordingly, according to the ECU 30 of the present embodiment, it is possible to determine the presence or absence of the passenger M with higher accuracy by performing the passenger detection based on only the highly reliable face determination degree.

Embodiment 3

In the present embodiment, in addition to the determination of the presence or absence of the passenger M according to the threshold value of the load in Embodiment 1, it is added on condition that the timing of the face determination matches the timing at which the load of the seat increases. For example, in a case where the passenger M gets in the vehicle 10 and is seated on the seat 14b, the time at which the imaging device 24 images the face of the passenger M and the timing at which the load of the seat 14b increases are matched with each other. In the present embodiment, the presence or absence of the passenger M is determined with higher accuracy by determining the presence or absence of such a timing matching.

The timing of the face determination is set to an imaging time of the captured image in a case where the face determination of the captured image is equal to or more than a predetermined value. In addition, the timing when the load of the seat increases is set to a time when the load increases in a certain amount or more. Increasing in a certain amount or more means, for example, that the load increases by 10 kg or more. In addition, matching the timing means that a time difference between the timing of the face determination and the timing when the load of the seat increases is within a predetermined time.

Figure 11:
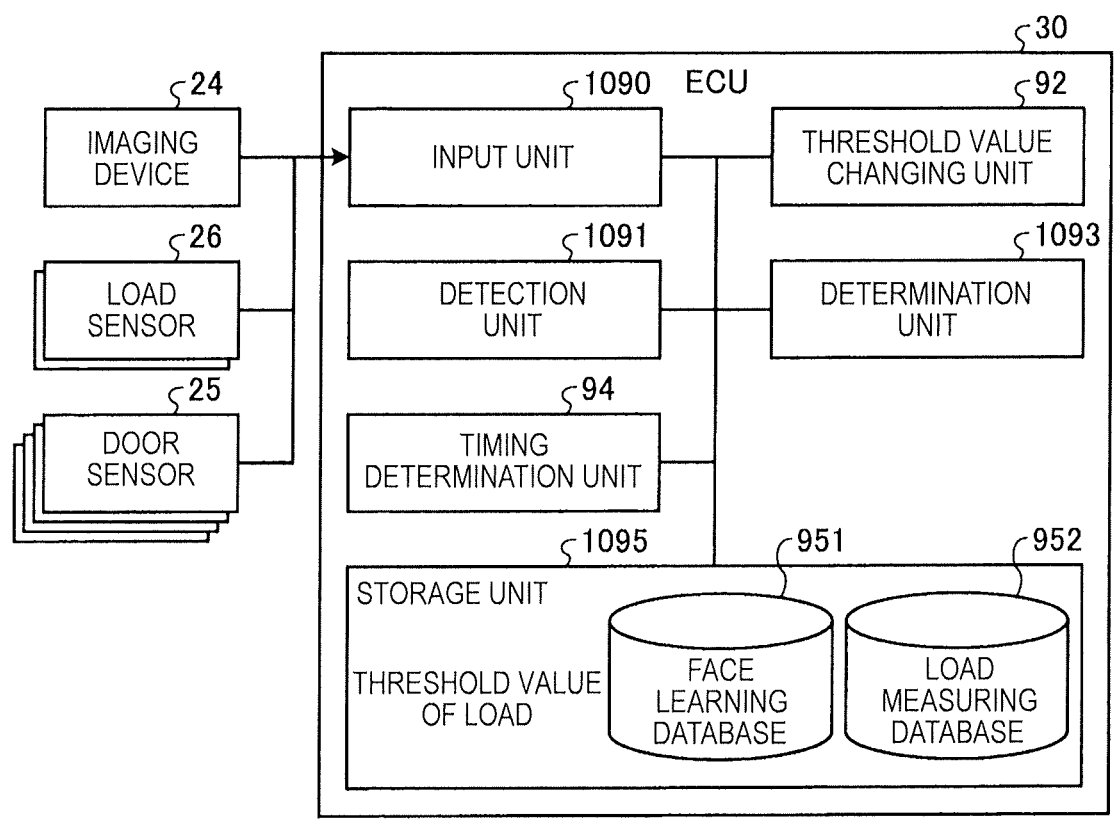
FIG. 11 is a block diagram illustrating an example of a functional configuration of an ECU according to Embodiment 3.

FIG. 11 is a block diagram illustrating an example of a functional configuration of the ECU 30 according to the present embodiment. As illustrated in FIG. 11, the ECU 30 mainly functions as an input unit 1090, a detection unit 1091, the threshold value changing unit 92, a determination unit 1093, and a timing determination unit 94. As illustrated in FIG. 11, each of configurations of the input unit 1090, the detection unit 1091, the threshold value changing unit 92, the determination unit 1093, and the timing determination unit 94 is realized by executing the program stored in the ROM 33 by the CPU 31. These configurations may be realized by a hardware circuit. The threshold value changing unit 92 is the same as that of Embodiment 1 illustrated in FIG. 6.

Similar to Embodiment 1, a storage unit 1095 illustrated in FIG. 11 is configured by a storage device such as the SSD 32, for example. In addition to the same content as that of Embodiment 1, the storage unit 1095 further stores a load measuring database 952.

The input unit 1090 has the same function as that of Embodiment 1 and transmits the received captured image and the time when the captured image is received, that is, the imaging time of the captured image in association with each other to the timing determination unit 94. In addition, the input unit 1090 stores load measuring data by associating the received load and the time when the load is received, that is, the measuring time of the load with each other to the load measuring database 952 of the storage unit 1095. The input unit 1090 may adopt a configuration acquiring the time from a time circuit (not illustrated) in the ECU 30. In addition, the input unit 1090 may adopt a configuration acquiring a time from an external device (not illustrated).

In a case where the time difference between the timing of the face determination and the timing when the load of the seat increases is within the predetermined time, the timing determination unit 94 determines that the timings are matched. In other words, in a case where the difference between the time when the captured image in which the face determination degree is equal to or more than the predetermined reference is received and the time when the load of the seat increases in a certain amount or more is within the predetermined time, the timing determination unit 94 determines that the timings are matched. For example, in a case where the time difference between the timing of the face determination and the timing when the load of the seat increases is within in ±5 seconds, the timing determination unit 94 determines that the timings are matched. The predetermined reference of the face determination degree in the present embodiment is set, for example, to the reference value a illustrated in FIG. 8. Alternatively, the second reference value b2 illustrated in FIG. 8 may be set as a predetermined reference.

Specifically, the timing determination unit 94 acquires the captured image and the imaging time from the input unit 1090. In addition, in a case where, in the captured image, the face determination degree obtained by the detection unit 1091 is equal to or more than the reference value a, the timing determination unit 94 searches load measuring data within the past 5 seconds from the imaging time of the captured image from the load measuring database 952 and calculates the increasing amount of the load. In a case where the increasing amount of the load within the past 5 seconds from the imaging time of the captured image is 10 kg or more, the timing determination unit 94 determines that the timing of face determination matches the timing when the load of the seat increases.

In addition, if the increasing amount of the load within the past 5 seconds is less than 10 kg from the imaging time of the captured image in which the face determination degree is equal to or more than the reference value a, the timing determination unit 94 repeats acquisition of the load measuring data and calculation of the increasing amount of the load until 5 seconds have elapsed from the imaging time of the captured image. In a case where the load increases by 10 kg or more from the imaging time of the captured image by 5 seconds, the timing determination unit 94 determines that the timing of the face determination matches the timing of the increase in the load of the seat.

In a case where the load does increase by 10 kg or more from the imaging time of the captured image in which the face determination degree is equal to or more than the reference value a within the past 5 seconds or until 5 seconds elapse from the imaging time of the captured image, the timing determination unit 94 determines that timing of the face determination does not match the timing when the load of the seat increases.

In addition, in a case where the face determination degree is not equal to or more than the reference value a, the timing of the face determination to be a reference to the determination of the timing is not detected. In such a case, the timing determination unit 94 determines that there is no face detection. The timing determination unit 94 stores the timing determination result to the storage unit 1095, for example. Alternatively, the timing determination unit 94 may transmit the timing determination result to the determination unit 1093.

The detection unit 1091 has the same function as that of Embodiment 1. In addition, the detection unit 1091 of the present embodiment further transmits the obtained face determination degree in the timing determination process to the timing determination unit 94. In addition, the detection unit 1091 transmits the obtained face determination degree in the passenger detection process to the threshold value changing unit 92.

Specifically, the timing determination process, for example, starts in a case where the input unit 1090 receives the signal indicating that the door is in an open state from the door sensor 25, for example. In addition, the passenger detection process starts after ending the timing determination process. For example, in a case where the detection unit 1091 acquires the signal indicating that the door is in an open state from the input unit 1090, the detection unit 1091 may adopt the configuration that the obtained face determination degree is transmitted to the timing determination unit 94. In addition, in a case where the notification of end of the timing determination process from the timing determination unit 94 is acquired, the detection unit 1091 may adopt a configuration of transmitting the obtained face determination degree in the passenger detection process to the threshold value changing unit 92.

In a case where the load acquired from the input unit 1090 is equal to or more than the threshold value and the timing determination result is the "timing matching", the determination unit 1093 determines that the passenger M is seated on the seat 14b. That is, in a case where the detected load is equal to or more than the threshold value, and a difference between the time when the captured image in which the face determination degree is equal to or more than the predetermined reference is acquired and a time when the load increases in a certain amount or more is within a predetermined time, the determination unit 1093 determines that the passenger M is seated on the seat 14b. The determination unit 1093 may adopt a configuration that the determination result (the passenger detection result) of the presence or absence of the passenger M is stored in the storage unit 1095. Alternatively, the determination unit 1093 may adopt a configuration of outputting the determination result to an external device (not illustrated).

Since the above-described timing determination unit 94 determines the timing based on the face determination degree and the increasing amount of the load, it is possible to detect that the passenger M got into the seat 14b. On the other hand, whether the passenger M continues to be seated on the seat 14b or not can be determined by the determination unit 1093 periodically comparing the load with the threshold value.

Figure 12:
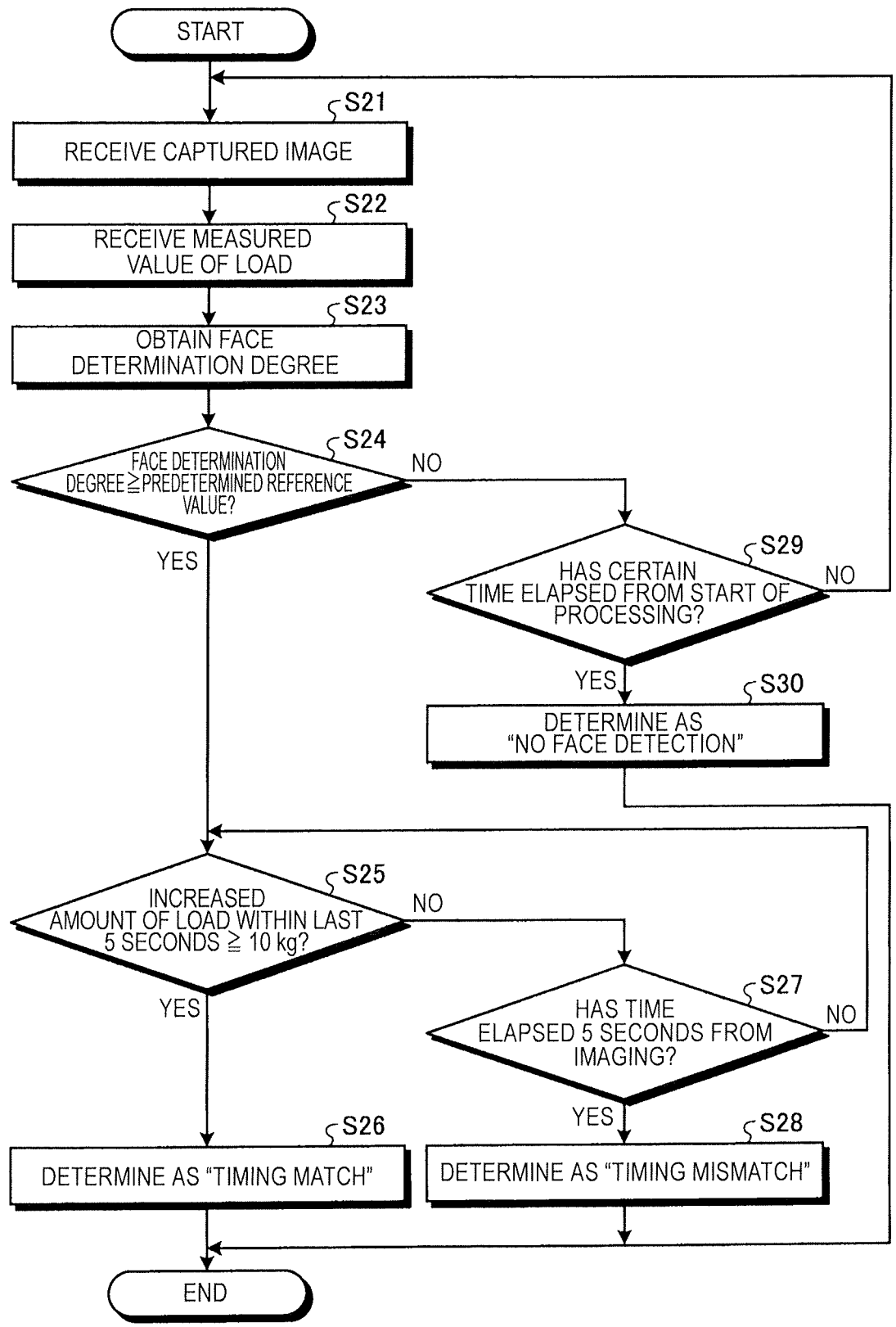
FIG. 12 is a flowchart illustrating an example of procedure of a timing determination process by the ECU according to Embodiment 3.

Next, a timing determination process of the present embodiment configured as described above will be described. FIG. 12 is a flowchart illustrating an example of procedure of a timing determination process by the ECU 30 according to the present embodiment. A process of the flowchart starts, for example, in a case where the input unit 1090 receives the signal indicating an opening state of the door from the door sensor 25. Alternatively, the process of this flowchart may be started in a case where the ignition power supply of the vehicle 10 is turned on.

The input unit 1090 receives the captured image from the imaging device 24 (S21). The input unit 1090 transmits the received captured image and the imaging time of the captured image in association with each other to the detection unit 1091. In addition, the input unit 1090 receives the measured value of the load from the load sensor 26 (S22). In addition, the input unit 1090 stores load measuring data associating the received load and the load measuring time of the load with each other to the load measuring database 952 of the storage unit 1095. The input unit 1090 receives the measured value of the load at certain time intervals, for example, at intervals of one second until the process of the flowchart ends, and stores the load measuring data associating the received load with the measuring time of the load to the load measuring database 952 of the storage unit 1095.

The detection unit 1091 obtains the face determination degree in the received captured image (S23). The detection unit 1091 transmits the face determination degree of the captured image and the imaging time to the timing determination unit 94.

The timing determination unit 94 compares the face determination degree acquired from the detection unit 1091 with the reference value a (S24). In a case where it is determined that the face determination degree is equal to or more than the reference value a ("Yes" in S24), the timing determination unit 94 searches the load measuring data within the past 5 seconds from the imaging time of the captured image from the load measuring database 952. In a case where the increasing amount of the load within the past 5 seconds is 10 kg or more ("Yes" in S25), the timing determination unit 94 determines that the timing of the face determination and the timing of increasing the load of the seat are matched to each other ("timing match") (S26).

In addition, in a case where the load increasing amount within the past 5 seconds is less than 10 kg ("No" in S25), the timing determination unit 94 determines whether 5 seconds have elapsed since the imaging time of the captured image (S27). In a case where the timing determination unit 94 determines that 5 seconds does not have elapsed since the imaging time of the captured image ("No" in S27), the timing determination unit 94 repeats processes of S25 and S27 until 5 seconds have elapsed since the imaging time of the captured image. Meanwhile, the input unit 1090 receives the measured value of the load at a certain time interval, and a process of S22 in which the load measuring data correlating the received load and the measuring time of the load is stored in the load measuring database 952 of the storage unit 1095 continues. The timing determination unit 94 repeats the processes of S25 and S27 to calculate an increasing amount of the newly received load.

In a case where the load does not increase by 10 kg or more until the 5 seconds have elapsed from the imaging time of the captured image ("No" in S25, and "Yes" in S27), the timing determination unit 94 determines that the timing of the face determination does not match the timing when the load of the seat increases ("timing mismatch") (S28).

On the other hand, in a case where the face determination degree is less than the reference value a ("No" in S24), the timing determination unit 94 and the input unit 1090 repeat processes of S21 to S24 and S29 until a certain time has elapsed since the start of the process of the flowchart ("No" in S29). For example, it takes some time for the passenger M to board the vehicle 10 and turn the face of the passenger M toward the imaging device 24 after the door of the vehicle 10 is in the open state, in some cases. The timing determination unit 94, the input unit 1090, and the detection unit 1091 repeat the processes for a certain time, it can determine the timing even when it takes the time from the start of the process until the imaging of the face of the passenger M.

In a case where the captured image in which the face determination degree is equal to or more than the reference value a is not received even when a certain time has elapsed from the start of the process of the flowchart ("Yes" in S29), the timing determination unit 94 determines that "there is no face detection" (S30). The timing determination unit 94 stores the determination result to the storage unit 1095, for example. Alternatively, the timing determination unit 94 may transmit the timing determination result to the determination unit 1093.

In FIG. 12, the process ends in a case where a certain time has elapsed since start of the process. However, it is not limited thereto. For example, the timing determination unit 94, the input unit 1090, and the detection unit 1091 may adopt a configuration of repeating the processes of S21 to S25 and S27 until the determination result of "timing match" or "timing mismatch" is obtained. Alternatively, in a case where the determination result is "timing mismatch" or "there is no face detection", a configuration in which the processing of the flowchart starts again may be adopted.

Figure 13:
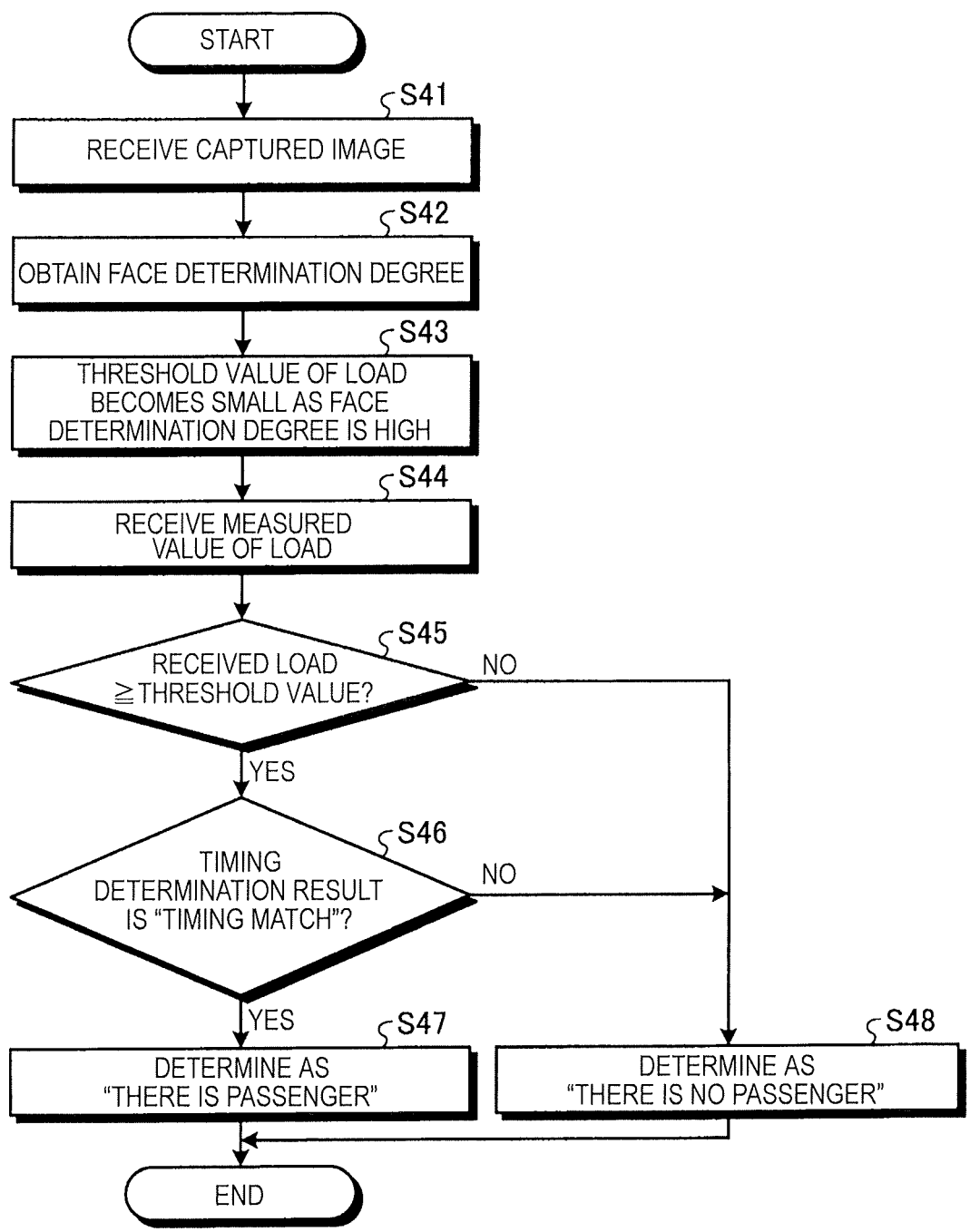
FIG. 13 is a flowchart illustrating an example of a procedure of a passenger detection process by the ECU according to Embodiment 3.

Next, a passenger detection process of the present embodiment will be described. FIG. 13 is a flowchart illustrating an example of procedure of a passenger detection process by the ECU 30 according to the present embodiment. A process of the flowchart starts in a case where the timing determination result is stored in a storage unit 1095 by the timing determination unit 94. Alternatively, the process of this flowchart may be started at certain time intervals in a case where an ignition power supply is turned on.

The process of receiving of the captured image in S41 and the process for comparing the received loads and the threshold value in S45 are the same as the processes of S1 to S5 of Embodiment 1 illustrated in FIG. 9.

In a case where the received load is equal to or more than threshold value ("Yes" in S45), the determination unit 1093 of the present embodiment further determines whether the timing determination result is in "timing match" (S46). The determination unit 1093 may acquire the timing determination result stored in the storage unit 1095 and may acquire the determination result from the timing determination unit 94 when ending the timing determination process of FIG. 12.

In a case where the timing determination result is in "timing match" ("Yes" in S46), the determination unit 1093 determines that the passenger M is seated on the seat 14b and determines as "there is passenger" (S47).

In a case where the timing determination result is not in "timing match" ("No" in S46), the determination unit 1093 determines that there is no passenger M seated on the seat 14b and determined as "there is no passenger" (S48). In addition, similar to Embodiment 1, in a case where the received load is less than the threshold value ("No" in S45), the determination unit 1093 determines that there is no passenger M seated on the seat 14b, and determines as "there is no passenger" (S48). When the determination unit 1093 determines the presence or absence of the passenger M, a process of the flowchart ends.

As described above, the passenger detection process of FIG. 13 may be executed after the timing determination process, or may be periodically executed in a case where the ignition power supply of the vehicle 10 is in an ON state. By periodically executing the passenger detection process, the determination unit 1093 detects that the load is equal to or less than the threshold value, for example, in a case where the passenger M gets off the seat 14b after it is determined as "there is a passenger", and it is determined that "there is no passenger".

As described above, in a case where the detected load is equal to or more than the threshold value, and a difference between a time at which the captured image in which the face determination degree is equal to or more than a predetermined reference is acquired and a time at which the load increases to a certain amount or more is within a predetermined time, the determination unit 1093 of the present embodiment determines that the passenger M is seated on the seat 14b. Accordingly, in the determination unit 1093 according to the present embodiment, it is possible to suppress the erroneous detection by setting the both conditions that it is determined whether the load is equal to or more than the threshold value and it is determined whether a timing of a variation of the load matches a timing of a face determination, whereby determining the presence or absence of the passenger with higher accuracy.

For example, since in a case where the load is varied by placing the baggage on the seat 14b, the face determination degree in the captured image is not equal to or more than the reference value a, it is possible to suppress the erroneous detection of a baggage as the passenger M. In addition, since even in a case where the face determination degree of the captured image is high depending on a pattern of the seat 14b or even in a case where the face of the passenger on the back seat appears in the captured image, it does not match the timing of the increase of the load of the seat 14b, it is possible to suppress erroneous detection.

In the present embodiment, in a case where both conditions that the timing of the face determination matches the timing when the load of the seat increases and the load is equal to or more than the threshold value are satisfied, the determination unit 1093 determines that the passenger M is seated on the seat 14b. However, it is not limited thereto. For example, in a case where the timing determination process illustrated in FIG. 12 is singly executed and the determination result is "timing match", the ECU 30 may adopt a configuration that it is determined that the passenger M is seated on the seat 14b and it is determined as "there is a passenger". In a case of adopting the configuration, since the presence or absence of the passenger M is detected with less processes, it is possible to reduce the process load.

In addition, the ECU 30 does not necessarily change the load threshold value according to the face determination degree. For example, in a case where the determination result of the timing determination process is in "timing match", the ECU 30 may adopt a configuration that it is determined that the passenger M is seated on the seat 14b in a case where the received load is equal to or more than the threshold value of the load stored in the storage unit 1095 and it is determined as "there is a passenger".

In addition, in the present embodiment, it is determined whether the increasing amount of the load within 5 seconds before and after is equal to or more than 10 kg with reference to a case where the face determination degree is equal to or more than the reference value a. However, it is not limited thereto. For example, a configuration in which it is detected that the load within the predetermined time is increased by 10 kg or more and determined whether the face determination degree is equal to or more than the reference value a within the 5 seconds before and after the time (which is the reference) when the load is increased by 10 kg or more may be adopted.

In addition, in the present embodiment, the reference of increasing the load more than a certain value is set to 10 kg, but this is an example, and the reference of the increasing amount of the load is not limited thereto. In addition, in the present embodiment, the time difference for determining that the timings match to each other by the timing determination unit 94 is ±5 seconds, but this is only an example, and the reference of the time difference is not limited thereto.

In addition, in the present embodiment, in the timing determination process, the configuration that the input unit 1090 receives the measured value of the load is adopted. However, it is not limited thereto. For example, the input unit 1090 may adopt a configuration that the measured value of the load is received at a certain time, for example, every 1 second, and the load measuring data is continuously stored in the storage unit 1095 regardless of the start of the timing determination process.

In addition, in the present embodiment, "timing mismatch" and "there is no face detection" are distinguished, but it is not limited thereto. The timing determination unit 94 may adopt a configuration for simply determining whether the timings match.

In addition, in the ECU 30 of the present embodiment, the passenger detection process is executed after the timing determination process. However, the timing determination process may be incorporated in the passenger detection process.

Embodiment 4

In the embodiment 1, the presence or absence of the passenger M is determined by the load of the seat 14b. However, in a case where the baggage is stored in a pocket at a back surface of the seat 14b or the like, the load due to the passenger and the load due to the baggage are also measured. The ECU 30 of the present embodiment estimates the load due to the passenger with good accuracy by subtracting the load in the empty seat state from the load measuring value and performs the passenger detection with higher accuracy.

The empty seat state in the present embodiment means a state where the passenger M is not seated on the seat 14b, in other words, in an unmanned state. The empty seat state includes a state where the baggage or the like is placed on the seat 14b and a state in which a baggage is present in a pocket or a hook on the back surface of the seat 14b.

Figure 14:
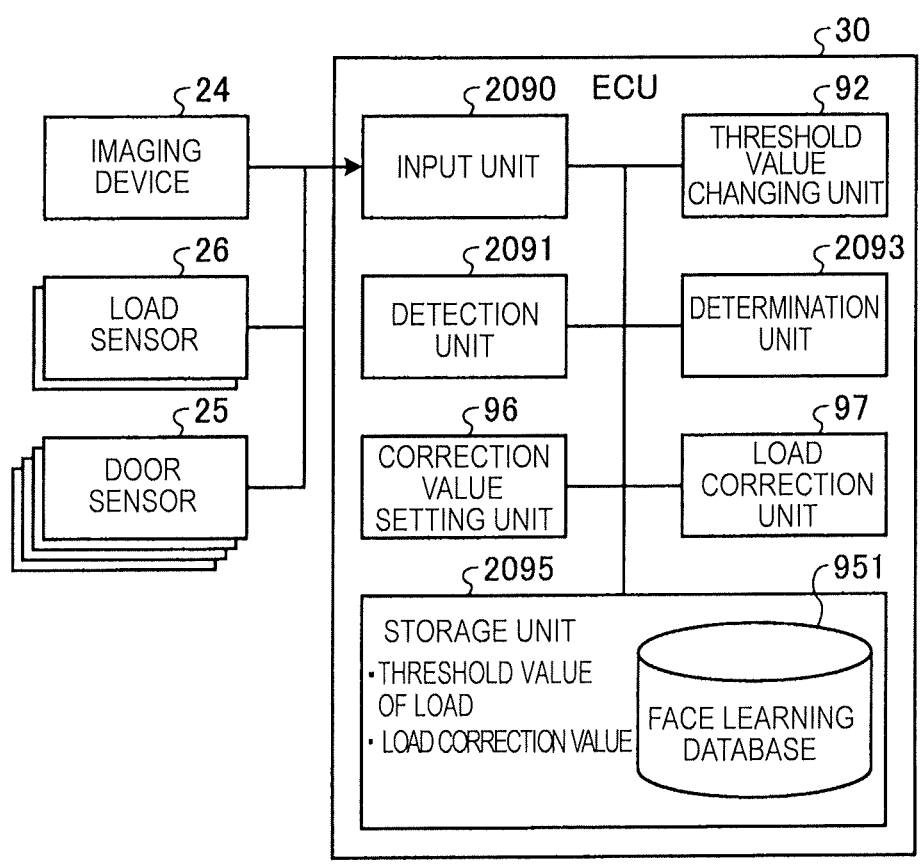
FIG. 14 is a block diagram illustrating an example of a functional configuration of an ECU according to Embodiment 4.

FIG. 14 is a block diagram illustrating an example of a functional configuration of the ECU 30 according to the present embodiment. As illustrated in FIG. 14, the ECU 30 mainly functions as an input unit 2090, a detection unit 2091, the threshold value changing unit 92, a determination unit 2093, a storage unit 2095, a correction value setting unit 96, and a load correction unit 97. As illustrated in FIG. 14, each of configurations of the input unit 2090, the detection unit 2091, the threshold value changing unit 92, the determination unit 2093, the correction value setting unit 96, and the load correction unit 97 is realized by executing the program stored in the ROM 33 by the CPU 31. These configurations may be realized by a hardware circuit. The threshold value changing unit 92 is the same as that of Embodiment 1 illustrated in FIG. 6.

Similar to Embodiment 1, the storage unit 2095 illustrated in FIG. 14 is configured by a storage device such as the SSD 32, for example. In addition to the same content as that of Embodiment 1, the storage unit 2095 further stores a load correction value to be described.

The correction value setting unit 96 sets the load of the seat 14b in the empty seat state as the load correction value. Specifically, in a case where the face determination degree of the captured image obtained by the the detection unit 2091 is less than a predetermined reference, the correction value setting unit 96 determines that the load received by the input unit 2090 is a load in the empty seat state.

The predetermined reference of the face determination degree in the present embodiment is set, for example, to the reference value a illustrated in FIG. 8. Alternatively, the second reference value b2 illustrated in FIG. 8 may be set as a predetermined reference.

The correction value setting unit 96 stores the load of the seat 14b in the empty seat state to the storage unit 2095 as the load correction value. The baggage stored in the pocket of the seat 14b is not always the same weight at all times. Therefore, in the ECU 30 of the present embodiment, the load detection process in the empty seat state described below is periodically executed. Therefore, the correction value setting unit 96 detects the load of the latest empty seat state and updates the load correction value.

The load correction unit 97 subtracts the load correction value from the load received by the input unit 2090 to correct the load. For example, in a case where 3 kg of the baggage is stored in advance in the pocket or the like of the back surface of the seat 14b, the load in the empty seat state is 3 kg. In the passenger detection process, in a case where the load received by the input unit 2090 is 40 kg, the load correction unit 97 subtracts 3 kg from the load and corrects the load to 37 kg. In other words, by subtracting the weight in the empty seat state from the load received by the input unit 2090, the load correction unit 97 estimates the load due to the weight of the passenger M. The load correction unit 97 transmits the weight after correcting to the determination unit 2093.

The input unit 2090 has the same function as that of Embodiment 1, and in the load detection process of the empty seat state, the input unit 2090 transmits the received load to the correction value setting unit 96.

The detection unit 2091 has the same function as that of Embodiment 1. In the load detection process in the empty seat state, the detection unit 2091 of the present embodiment further transmits the obtained face determination degree to the correction value setting unit 96. In addition, in the passenger detection process, the detection unit 2091 transmits the obtained face determination degree to the threshold value changing unit 92.

Whether one of the load detection process in the empty seat state and the passenger detection process is executed may be distinguished by the time, for example. For example, the load detection process in the empty seat state may be started at a certain time interval such as every hour. In addition, a configuration in which the load detection process in the empty seat state may be executed at a certain time interval even in a state where the ignition power supply is turned off may be adopted. In a case of adopting the configuration, the ECU 30 of the present embodiment may adopt the configuration that the power supply is supplied from a battery (not illustrated). On the other hand, the passenger detection process is started in a case where the signal indicating the opening and closing the door is received by the input unit 2090, for example. Alternatively, the passenger detection process may be executed at a certain time interval in a case where an ignition power supply of the vehicle 10 is turned on. The execution interval of the passenger detection process is assumed to be shorter than the load detection process in the empty seat state.

The determination unit 2093 acquires the load after correcting from the load correction unit 97 and acquires the threshold value after changing from the threshold value changing unit 92. In a case where the load corrected by the load correction unit 97 is equal to or more than the threshold value, the determination unit 2093 determines that the passenger M is seated on the seat 14*b*.

Figure 15:
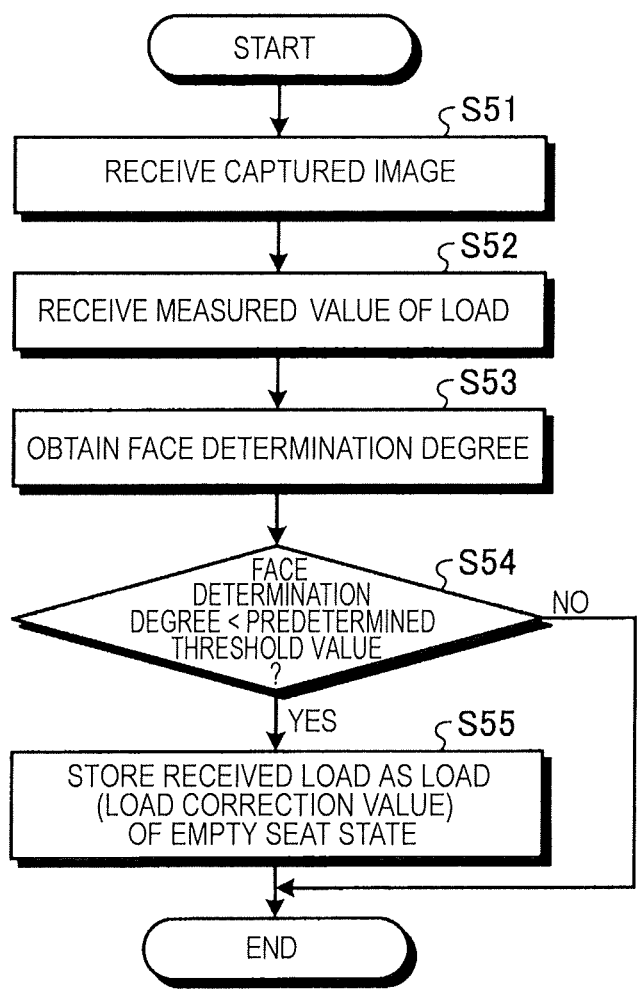
FIG. 15 is a flowchart illustrating an example of a procedure of a load detection process in an empty seat state by the ECU according to Embodiment 4.

Next, the load detection process in the empty seat state of the present embodiment configured in the above-described manner will be described. FIG. 15 is a flowchart illustrating an example of a procedure of a load detection process in the empty seat state by the ECU 30 according to the present embodiment. The processes of the flowchart are started at a certain time interval such as every hour, for example.

The input unit 2090 receives the captured image from the imaging device 24 (S51). The input unit 2090 transmits the received captured image to the detection unit 2091. In addition, the input unit 2090 receives the measured value of the load from the load sensor 26 (S52). The input unit 2090 transmits the received load to the correction value setting unit 96.

The detection unit 2091 obtains the face determination degree in the received captured image (S53). The detection unit 2091 transmits the obtained face determination degree to the correction value setting unit 96.

In a case where the face determination degree of the captured image which is obtained by the detection unit 2091 is less than the reference value a ("Yes" in S54), the correction value setting unit 96 determines the load received by the input unit 2090 as the load in the empty seat state. The correction value setting unit 96 stores the load in the empty seat state to the storage unit 2095 as the load correction value (S55). In a case where the load correction value stored by the processes of the previous flowchart is stored in the storage unit 2095, the correction value setting unit 96 may adopt the configuration of overwriting with the latest load correction value.

In addition, in a case where the face determination degree of the captured image obtained by the detection unit 2091 is equal to or more than the reference value a ("No" in S54), the correction value setting unit 96 determines that the load received by the input unit 2090 is not the load in the empty seat state and ends the process.

Figure 16:
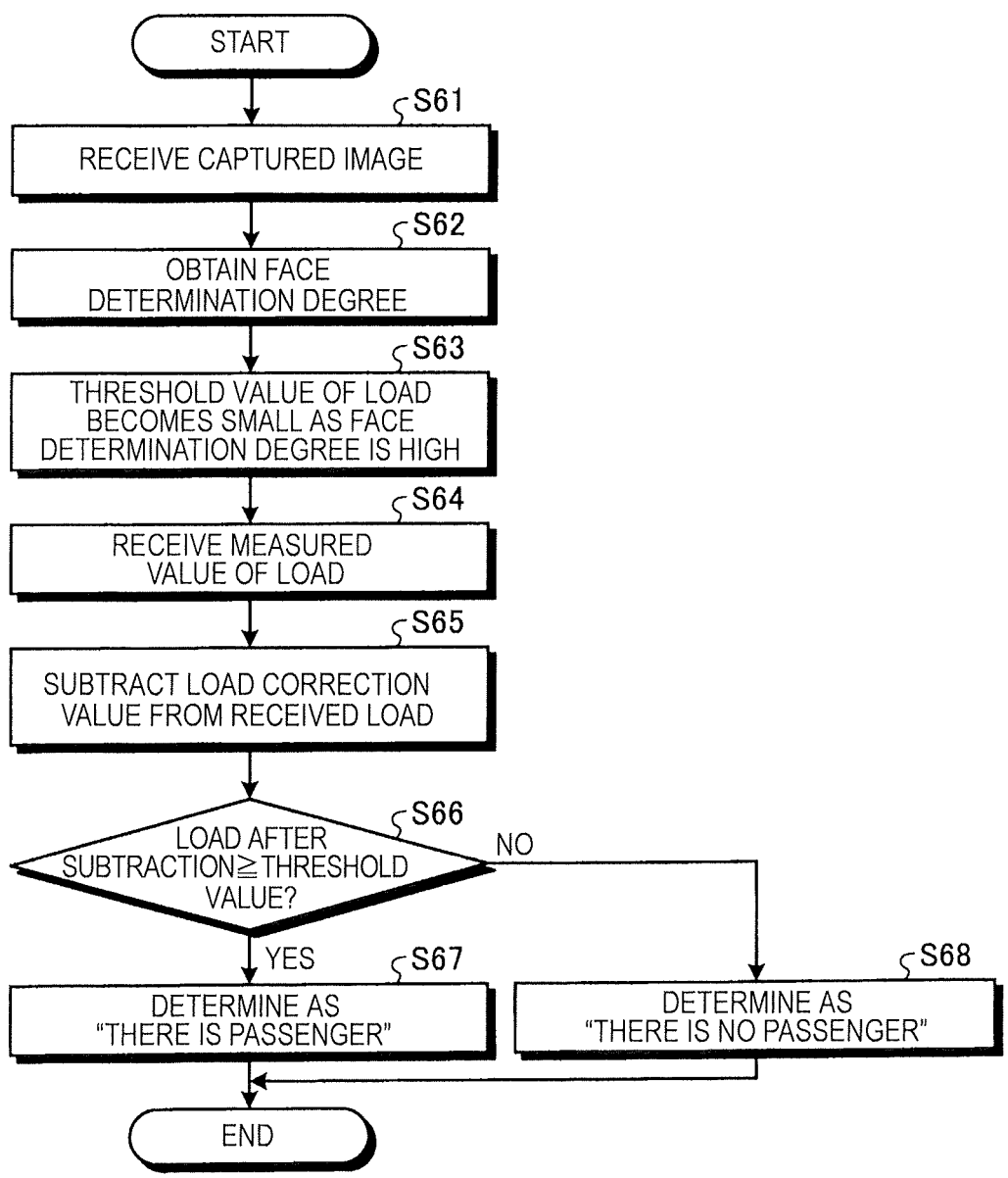
FIG. 16 is a flowchart illustrating an example of a procedure of a passenger detection process by the ECU according to Embodiment 4.

Next, the passenger detection process of the present embodiment will be described. FIG. 16 is a flowchart illustrating an example of procedure of a passenger detection process by the ECU 30 according to the present embodiment. A process of the flowchart starts, for example, in a case where the input unit 2090 receives the signal indicating opening and closing the door. Alternatively, the process of this flowchart may be executed at a certain time interval in a case where an ignition power supply of the vehicle 10 is turned on.

Processes of receiving of the captured image in S61 and changing the threshold value of the load of S63 are the same as the processes S1 to S3 of Embodiment 1 illustrated in FIG. 9.

The input unit 2090 receives a measured value of the load from the load sensor 26 (S64). The input unit 2090 transmits the received measured value of the load to the load correction unit 97.

The load correction unit 97 subtracts the load correction value stored in the storage unit 2095 from the load received by the input unit 2090 (S65). The load correction unit 97 transmits the load after subtracting to the determination unit 2093.

The determination unit 2093 acquires the load which is subtracted by the load correction unit 97 and the threshold value of the load which is changed by the threshold value changing unit 92. In a case where the load after subtracting is equal to or more than the threshold value ("Yes" in S66), the determination unit 2093 determines whether the passenger M is seated on the seat 14*b* and determines as "there is a passenger" (S67).

In addition, in a case where the load after subtracting is less than the threshold value of the load ("No" in S66), the determination unit 2093 determines that there is no passenger M seated on the seat 14*b*, and determines as "there is no passenger" (S68). When the determination unit 2093 determines the presence or absence of the passenger M, the process of the flowchart ends.

As described above, in the ECU 30 of the present embodiment, in a case where the face determination degree of the captured image is lower than the predetermined reference, the correction value setting unit 96 stores the load measured by the load sensor 26 as a load correction value to the storage unit 2095 and the load correction unit 97 corrects the load by the load correction value. Accordingly, according to the ECU 30 of the present embodiment, it is possible to exclude the load due to the baggage from the detected load to detect the load due to the weight of the passenger M with high accuracy. Therefore, according to the ECU 30 of the present embodiment, it is possible to distinguish the presence or absence of the passenger M seated on the seat 14*b* of the vehicle 10.

In the ECU 30 of the present embodiment, the load detection process in the empty seat state is performed in advance before the passenger detection process to calculate the load correction value. However, it is not limited thereto. For example, in a case where the determination result of the passenger detection process is "there is no passenger", the load received in the passenger detection process may be stored in the storage unit 2095 as the load correction value and the stored load may be used for correcting the load in the next and following passenger detection process.

Further, in the present embodiment, the load detection process in the empty seat state is started, for example, at intervals of one hour. However, the execution interval of the process is not limited thereto. For example, the execution interval of the process may be every other day or the like.

In addition, in the ECU 30 of the present embodiment, the face determination degree in the captured image is used for both the detection in the empty seat state and the change in the load threshold value. However, it is not limited thereto. For example, the ECU 30 of the present embodiment may adopt the configuration that the ECU 30 does not change the threshold value of the load.

A passenger detection device according to an aspect of this disclosure includes, as an example, an input unit that receives a captured image of an interior space of a vehicle imaged by an imaging device and a load measured by a load sensor provided on a seat provided in the interior space of the vehicle, a determination unit that determines that a passenger is seated on the seat, in a case where the load is equal to or more than a predetermined threshold value, a detection unit that obtains a face determination degree indicating a certainty of a face of the passenger in the captured image from the captured image, and a threshold value changing unit that changes the threshold value according to the face determination degree. Therefore, as an example, according to the passenger detection device, it is possible to suppress erroneous detection due to a load of a baggage or the like and distinguish the presence or absence of the passenger who is seated on the seat of the vehicle with high accuracy.

In the passenger detection device, as an example, the threshold value changing unit changes the threshold value to a smaller value as the face determination degree is high. Therefore, as an example, according to the passenger detection device, even in a case where a passenger having a light body weight is seated on the seat, it is possible to detect the passenger with high accuracy. In addition, as another example, according to the passenger detection device, even in a case where a baggage having the same degree of weight as the weight of a person is placed on the seat, it is possible to suppress the erroneous detection as the passenger.

In the passenger detection device, as an example, in a case where a difference between the face determination degree and a predetermined reference is within a predetermined range, the threshold value changing unit does not change the threshold value. Therefore, as an example, according to the passenger detection device, it is possible to determine the presence or absence of the passenger with high accuracy only using the highly reliable face determination degree.

In the passenger detection device, as an example, in a case where the detected load is equal to or more than the threshold value, and a difference between a time at which the captured image in which the face determination degree is equal to or more than a predetermined reference is acquired and a time at which the load increases to a certain amount or more is within a predetermined time, the determination unit determines that the passenger is seated on the seat. Therefore, as an example, according to the passenger detection device, it is possible to suppress the erroneous detection by setting the both conditions that it is determined whether the load is equal to or more than the threshold value and it is determined whether a timing of a variation of the load matches a timing of a face determination, whereby determining the presence or absence of the passenger with higher accuracy.

As an example, the passenger detection device further includes a correction value setting unit that in a case where the face determination degree of the captured image is lower than a predetermined reference, stores the detected load to a storage unit as a load correction value, and a load correction unit that corrects a value of the load by subtracting a load correction value stored in the storage unit from the detected load. In addition, in the passenger detection device, as an example, in a case where the load after corrected by the load correction unit is equal to or more than the threshold value, the determination unit determines that the passenger is seated on the seat. Therefore, as an example, according to the passenger detection device, it is possible to detect the load due to the weight of the passenger with high accuracy by excluding the load due to the baggage from the received load. Accordingly, as an example, according to the passenger detection device, it is possible to determine the presence or absence of the passenger with higher accuracy.

A passenger detection program according to an aspect of this disclosure causes, as an example, a computer to execute steps of: receiving a captured image of an interior space of a vehicle imaged by an imaging device and a load measured by a load sensor provided on a seat provided in the interior space of the vehicle; determining that a passenger is seated on the seat, in a case where the load is equal to or more than a predetermined threshold value; obtaining a face determination degree indicating a certainty of a face of the passenger in the captured image, from the captured image; and changing the threshold value according to the face determination degree.

Hereinbefore, the embodiments of this disclosure have been described. The above-mentioned embodiment and modification examples are merely examples and do not intend to limit a range of this disclosure. The embodiment or modification examples can be implemented in various other modes and various omissions, replacements, combinations, and changes can be made in a range without departing from the scope of this disclosure. In addition, the embodiments and the modification examples can be implemented while the configurations and the shapes in the embodiments and the modification examples are partially exchanged.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A passenger detection device comprising:
   circuitry configured to:
   receive a captured image of an interior space of a vehicle imaged by an imaging device;
   obtain a face determination degree indicating a certainty of a face of a passenger in the captured image from the captured image;
   change a threshold value based on the face determination degree;
   receive a load measured by a load sensor provided on a seat provided in the interior space of the vehicle;
   compare the measured load with the threshold value;
   determine that a passenger is seated on the seat, in a case where the load is equal to or more than the threshold value;
   in a case where the face determination degree of the captured image is lower than a predetermined reference, store a detected load to a storage unit as a load correction value; and
   correct a value of the load by subtracting the load correction value stored in the storage unit from the detected load, and
   in a case where the load after corrected by a load correction unit is equal to or more than the threshold value, determine that the passenger is seated on the seat,
   wherein the circuitry is configured to reduce the threshold value as the face determination degree increases.

2. The passenger detection device according to claim 1, wherein, in a case where a difference between the face determination degree and the predetermined reference is within a predetermined range, the circuitry is configured to not change the threshold value.

3. The passenger detection device according to claim 1, wherein, in a case where the detected load is equal to or more than the threshold value, and a difference between a time at which the captured image in which the face determination degree is equal to or more than the predetermined reference is acquired and a time at which the load increases to a certain amount or more is within a predetermined time, the circuitry is configured to determine that the passenger is seated on the seat.

4. A non-transitory computer readable medium including instructions for causing a computer to execute steps of:
receiving a captured image of an interior space of a vehicle imaged by an imaging device;
obtaining a face determination degree indicating a certainty of a face of a passenger in the captured image from the captured image;
changing a threshold value based on the face determination degree;
receiving a load measured by a load sensor provided on a seat provided in the interior space of the vehicle;
comparing the measured load with the threshold value;
determining that a passenger is seated on the seat in a case where the load is equal to or more than the threshold value;
in a case where the face determination degree of the captured image is lower than a predetermined reference, storing a detected load to a storage unit as a load correction value;
correcting a value of the load by subtracting the load correction value stored in the storage unit from the detected load; and
in a case where the value of the load that is corrected is equal to or more than the threshold value, determining that the passenger is seated on the seat,
wherein the threshold value is reduced as the face determination degree increases.

5. A passenger detection device comprising:
an input unit that receives a captured image of an interior space of a vehicle imaged by an imaging device and a load measured by a load sensor provided on a seat provided in the interior space of the vehicle;
a determination unit that determines that a passenger is seated on the seat, in a case where the load is equal to or more than a predetermined threshold value;
a detection unit that obtains a face determination degree indicating a certainty of a face of a passenger in the captured image from the captured image;
a threshold value changing unit that changes the threshold value according to the face determination degree;
a correction value setting unit that, in a case where the face determination degree of the captured image is lower than a predetermined reference, stores a detected load to a storage unit as a load correction value; and
a load correction unit that corrects a value of the load by subtracting the load correction value stored in the storage unit from the detected load,
wherein, in a case where the load, after being corrected by the load correction unit, is equal to or more than the threshold value, the determination unit determines that the passenger is seated on the seat.

* * * * *